United States Patent
Omata et al.

(10) Patent No.: US 9,120,388 B2
(45) Date of Patent: Sep. 1, 2015

(54) ROTATING ELECTRICAL MACHINE DRIVE SYSTEM

(71) Applicant: DENSO CORPORATION, Kariya, Aichi-pref. (JP)

(72) Inventors: Ryuji Omata, Obu (JP); Takeshi Itoh, Nagoya (JP); Hirofumi Kako, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 93 days.

(21) Appl. No.: 14/174,515

(22) Filed: Feb. 6, 2014

(65) Prior Publication Data

US 2014/0225535 A1 Aug. 14, 2014

(30) Foreign Application Priority Data

Feb. 8, 2013 (JP) .................................. 2013-23135

(51) Int. Cl.
| | |
|---|---|
| H02P 5/00 | (2006.01) |
| H02P 21/00 | (2006.01) |
| H02P 1/04 | (2006.01) |
| B60L 11/14 | (2006.01) |
| H02P 5/74 | (2006.01) |
| H02P 5/747 | (2006.01) |

(52) U.S. Cl.
CPC . B60L 11/14 (2013.01); H02P 5/74 (2013.01); H02P 5/747 (2013.01)

(58) Field of Classification Search
CPC ............. H02P 5/74; H02P 5/747; H02P 6/08; B60L 11/14
USPC .................................. 318/34, 400.02, 400.09
See application file for complete search history.

(56) References Cited

U.S. PATENT DOCUMENTS

| | | | |
|---|---|---|---|
| 2004/0066165 A1* | 4/2004 | Kamio et al. .................. | 318/701 |
| 2006/0012329 A1 | 1/2006 | Aoki et al. | |
| 2007/0241699 A1* | 10/2007 | Osada et al. ................... | 318/141 |
| 2007/0274109 A1 | 11/2007 | Oyobe et al. | |
| 2008/0079385 A1 | 4/2008 | Hashimoto et al. | |
| 2009/0021207 A1* | 1/2009 | Kezobo et al. ................ | 318/798 |
| 2009/0133947 A1 | 5/2009 | Yoshihara et al. | |
| 2009/0146612 A1* | 6/2009 | Oyobe et al. ................... | 320/138 |

(Continued)

FOREIGN PATENT DOCUMENTS

| | | |
|---|---|---|
| JP | 2004-159391 | 6/2004 |
| JP | 2012-002142 | 1/2012 |

OTHER PUBLICATIONS

Omata, et al., U.S. Appl. No. 14/174,102, filed Feb. 6, 2014.

(Continued)

*Primary Examiner* — Eduardo Colon Santana
*Assistant Examiner* — Gabriel Agared
(74) *Attorney, Agent, or Firm* — Nixon & Vanderhye PC

(57) ABSTRACT

In a system for driving a three-phase rotating electrical machine of drive sources for applying separate drive forces to a rotary shaft, a phase of the rotating electrical machine, a current of which is detected by a current sensor and capable of being used for control of the rotating electrical machine, is defined as an effective sensor-phase of the rotating electrical machine. When the number of the effective sensor-phases is one, the rotating electrical machine is driven in a one-phase control mode based on the current of the effective sensor-phase under a condition where a rotation speed of the rotating electrical machine is greater than a predetermined positive threshold, and driven by the drive forces of the other drive sources under a condition where the rotation speed is not greater than the threshold.

10 Claims, 21 Drawing Sheets

(56) References Cited

U.S. PATENT DOCUMENTS

| | | | |
|---|---|---|---|
| 2009/0284198 A1* | 11/2009 | Shimana et al. | 318/400.21 |
| 2011/0031906 A1* | 2/2011 | Yasohara et al. | 318/66 |
| 2012/0007568 A1* | 1/2012 | Horihata et al. | 322/21 |
| 2013/0026968 A1* | 1/2013 | Tagome et al. | 318/724 |
| 2013/0093374 A1* | 4/2013 | Chen | 318/400.29 |

OTHER PUBLICATIONS

Omata, et al., U.S. Appl. No. 14/174,147, filed Feb. 6, 2014.
Omata, et al., U.S. Appl. No. 14/174,159, filed Feb. 6, 2014.
Omata, et al., U.S. Appl. No. 14/174,161, filed Feb. 6, 2014.
Omata, et al., U.S. Appl. No. 14/174,193, filed Feb. 6, 2014.
Omata, et al., U.S. Appl. No. 14/174,200, filed Feb. 6, 2014.
Omata, et al., U.S. Appl. No. 14/174,213, filed Feb. 6, 2014.
Suzuki, et al., U.S. Appl. No. 14/039,262, filed Sep. 27, 2013.
Suzuki, et al., U.S. Appl. No. 14/039,273, filed Sep. 27, 2013.
Office Action (2 pages) dated Dec. 16, 2014 issued in corresponding Japanese Application No. 2013-023135 and English translation (2 pages).

\* cited by examiner

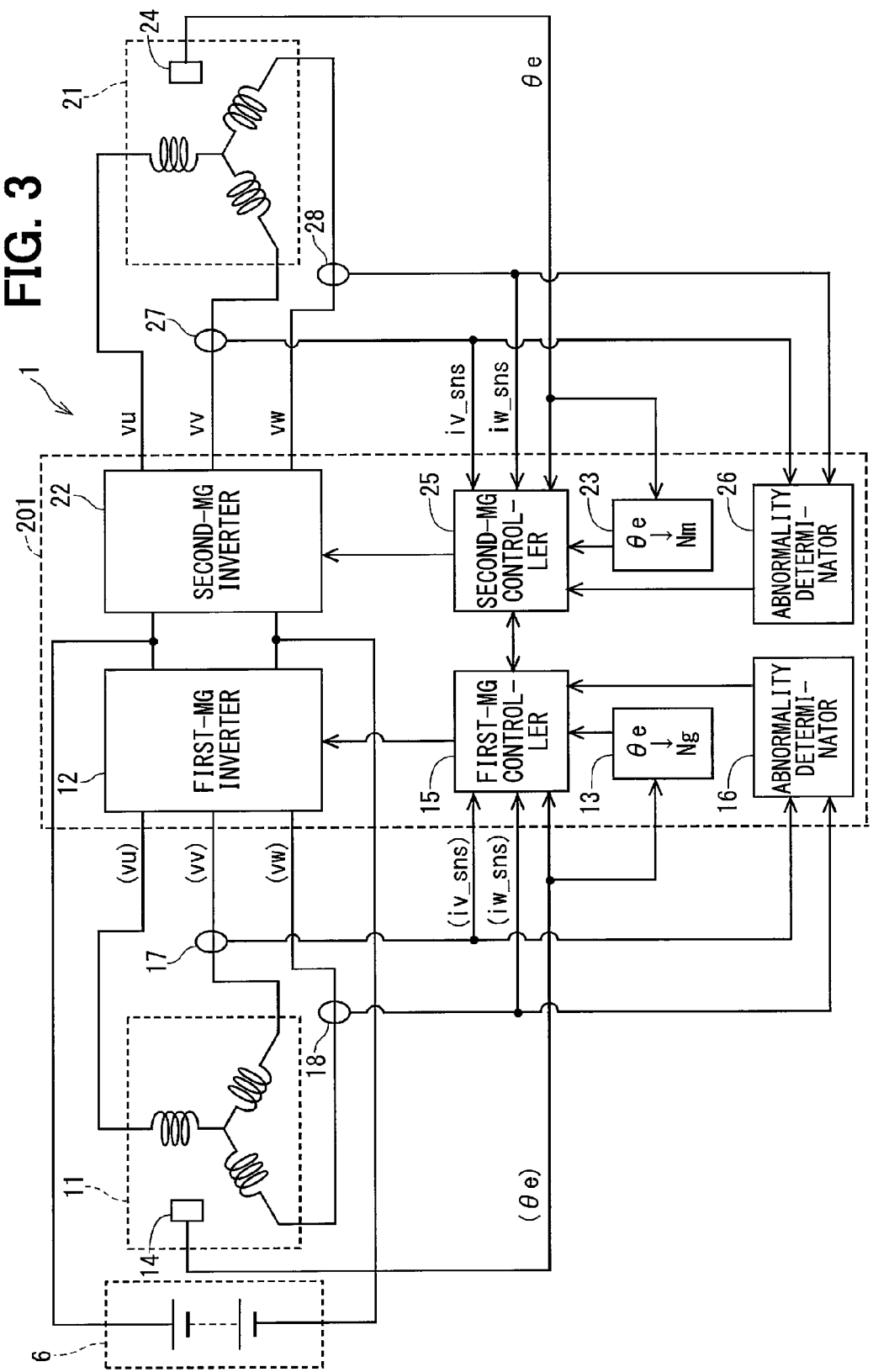

ROTATING ELECTRICAL MACHINE DRIVE SYSTEM

CROSS REFERENCE TO RELATED APPLICATION

This application is based on Japanese Patent Application No. 2013-23135 filed on Feb. 8, 2013, the contents of which are incorporated herein by reference.

FIELD

The present disclosure relates to a drive system for driving a three-phase rotating electrical machine.

BACKGROUND

In recent years, from social demands for low-fuel consumption and low exhaust emission, there has been an increased attention to a motor-operated vehicle, such as an electric vehicle or a hybrid vehicle, equipped with a rotating electrical machine as a drive source for rotating an axle of the vehicle. The rotating electrical machine functions not only as a motor but also a generator. For example, in such a motor-operated vehicle, the rotating electrical machine is connected to a battery unit (i.e., direct-current (DC) power source) constructed with rechargeable battery cells through a power converter such as an inverter. The inverter converts a DC voltage supplied from the battery unit to an AC voltage and drives the rotating electrical machine with the AC voltage.

In the field of rotating electrical machines mounded on a motor-operated vehicle as a drive source to apply a drive force to a shaft such as an axle of the vehicle, a structure in which a control current sensor for detecting a phase current is provided to only one of phases of a rotating electrical machine is known. According to this structure, since the number of current sensors is reduced, the size of the inverter near its output terminals is reduced, and the cost of a control system of the rotating electrical machine are reduced. As disclosed in, for example, JP-A-2008-86139 corresponding to US 2008/0079385, a so-called "one-phase control" is used in this structure. In the one-phase control, energization of the rotating electrical machine is controlled based on feedback of a current estimation value which is estimated based on one phase current detected by the control current sensor.

SUMMARY

In the technique disclosed in JP-A-2008-86139, current command values of two phases, other than a sensor-phase, out of three phase current command values, which are obtained by inverse dq transformation of d-axis and q-axis current command values, are treated as estimation values. Then, d-axis and q-axis current estimation values, which are obtained by dq transformation of a current detection value of the sensor-phase (e.g., W-phase) and current estimation values of the other two phases (e.g., U-phase and V-phase), are fed back to the d-axis and q-axis current command values.

A disadvantage of the technique is that since the current estimation values of the other two phases calculated from the d-axis and q-axis current command values reflect less actual information, control of the rotating electrical machine may become unstable. In particular, in a low rotation speed range where a rotation speed of the rotating electrical machine is smaller than a predetermined value, a change in a phase current with respect to time is small. Therefore, in the low rotation speed range, the actual information is further reduced, so that the control may become more unstable.

The same problem may occur when one of two control current sensors separately provided to two phases of a rotating electrical machine becomes abnormal and incapable of accurately detecting a phase current. That is, when the number of phase currents detected by normal control current sensors is one, the control may become unstable in the low rotation speed range of the rotating electrical machine.

Even when the control of the rotating electrical machine becomes unstable, the rotating electrical machine may be capable of being driven. However, in particular, when the rotating electrical machine is used in a drive system for driving a rotary shaft of a motor-operated vehicle, such unstable control of the rotating electrical machine may cause a reduction in driveability.

In view of the above, it is an object of the present disclosure to provide a rotating electrical machine drive system for driving a three-phase rotating electrical machine of drive sources for applying separate drive forces to a rotary shaft in such a manner that when the number of phase currents of the three-phase rotating electrical machine accurately detected by a current sensor for control is one, the rotating electrical machine is suitably controlled even in a low rotation speed range of the rotating electrical machine.

According to an aspect of the present disclosure, a rotating electrical machine drive system is used for driving at least one three-phase rotating electrical machine of multiple drive sources included in a rotary shaft drive system for applying separate drive forces to one rotary shaft acting on a target object or for applying the drive forces to multiple rotary shafts acting on the same target object in an overlapping manner. The rotating electrical machine drive system includes a specific rotating electrical machine, a rotation speed calculator, a control current sensor, and a control apparatus. The specific rotating electrical machine is one of the at least one three-phase rotating electrical machine. The rotation speed calculator calculates a rotation speed of the specific rotating electrical machine. The control current sensor detects a current of at least one phase of the specific rotating electrical machine. The detected current is used for control of the specific rotating electrical machine. The control apparatus controls the drive forces by controlling energization of the at least one three-phase rotating electrical machine. The at least one phase of the specific rotating electrical machine, the current of which is detected by the control current sensor and capable of being used for the control of the specific rotating electrical machine, is defined as an effective sensor-phase of the specific rotating electrical machine. When the number of the effective sensor-phases is one, the control apparatus drives the specific rotating electrical machine in a one-phase control based on the current of the effective sensor-phase under a condition where the specific rotating electrical machine rotates in a forward direction and the rotation speed is greater than a predetermined positive threshold value or under a condition where the specific rotating electrical machine rotates in a reverse direction and the rotation speed is smaller than a predetermined negative threshold value. When the number of the effective sensor-phases is one, the control apparatus drives the specific rotating electrical machine by using the drive force of at least one of the plurality of drive sources other than the specific rotating electrical machine under a condition where the specific rotating electrical machine rotates in the forward direction and the rotation speed is not greater than the positive threshold value or under a condition where the specific rotating electrical machine rotates in the reverse direction and the rotation speed is not smaller than the negative threshold value.

BRIEF DESCRIPTION OF THE DRAWINGS

The above and other objects, features and advantages of the present disclosure will become more apparent from the following detailed description made with reference to the accompanying drawings. In the drawings:

FIG. 3 is a block diagram of the rotating electrical machine drive system according to the first embodiment;

DETAILED DESCRIPTION

Embodiments of a rotating electrical machine drive system according to a present disclosure are described below with reference to the drawings. The rotating electrical machine drive system forms a part or the whole of an axle drive system for driving an axle of a motor-operated vehicle including a hybrid vehicle, an electric vehicle, and a fuel cell vehicle. The axle and the axle drive system respectively correspond to a rotary shaft and a rotary shaft drive system recited in claims.

Multiple drive sources separately apply drive forces to the axle of the motor-operated vehicle. In other words, the drive forces applied by the drive sources to the axle of the motor-operated vehicle are separate from each other. The drive sources include at least one rotating electrical machine. For example, the drive sources include at least one rotating electrical machine in a hybrid vehicle and includes multiple rotating electrical machines in an electric vehicle. The axle drive system can drive at least one axle. For example, as described in a second embodiment, the axle drive system can drive multiple axles of one vehicle.

First Embodiment

Figure 1:
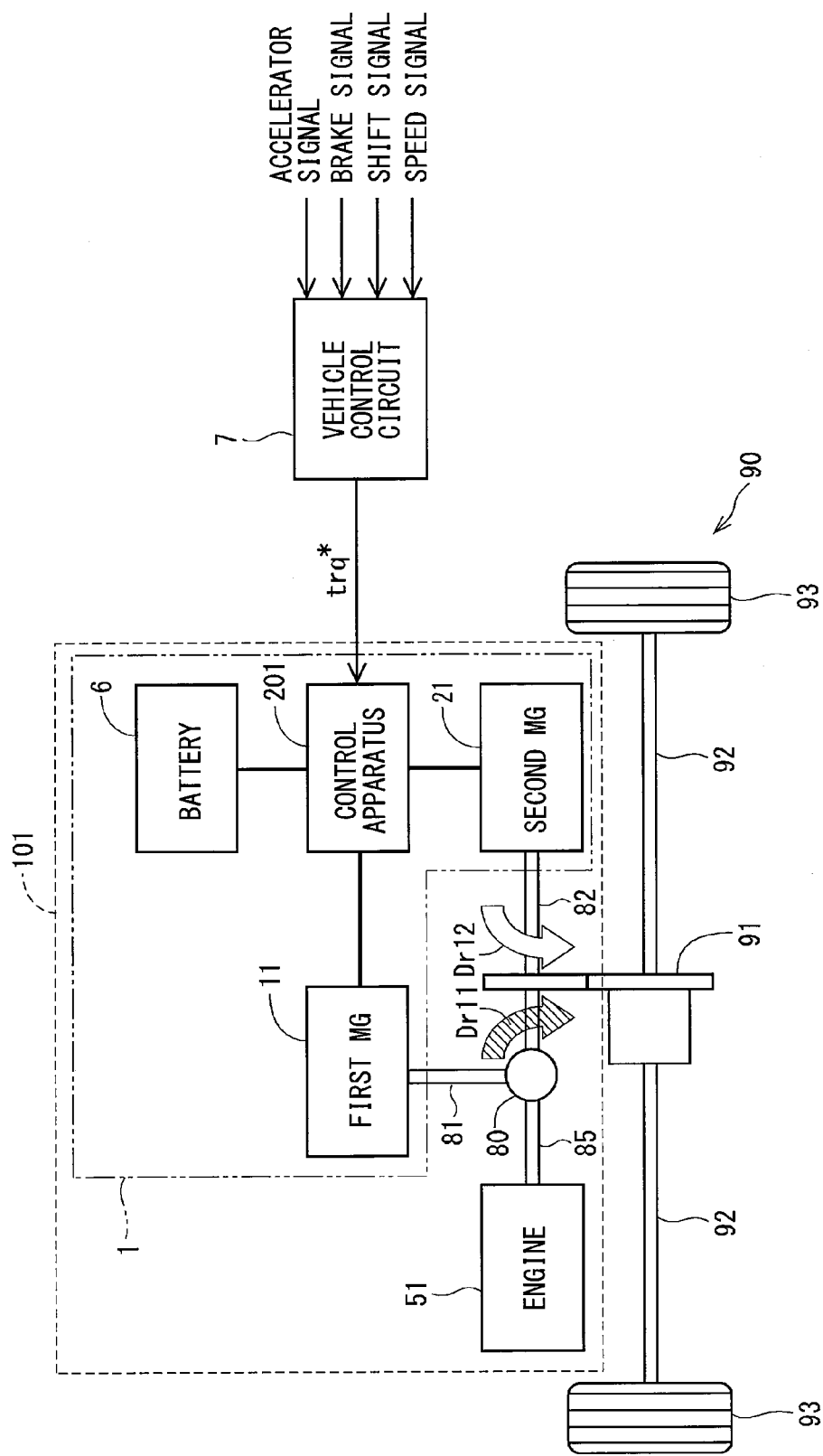
FIG. 1 is a diagram of a hybrid vehicle equipped with an axle drive system including a rotating electrical machine drive system according to a first embodiment of the present disclosure.

A rotating electrical machine drive system according to a first embodiment of the present disclosure is described below with reference to FIGS. 1-16. As shown in FIG. 1, an axle drive system 101 according to the first embodiment includes a rotating electrical machine drive system 1, an engine 51, and a force transmission mechanism 80. The rotating electrical machine drive system 1 includes a first MG 11 as a first rotating electrical machine, a second MG 21 as a second rotating electrical machine, and a battery 6 as a power storage device, and a control apparatus 201.

The axle drive system 101 includes the engine 51, the first MG 11, and the second MG 21 as multiple drive sources for separately applying drive forces to an axle 92 as one rotary shaft acting on a vehicle body 90 as a target object. When one of the first MG 11 and the second MG 21 is defined as a specific rotating electrical machine recited in claims, the engine 51 and the other of the first MG 11, and the second MG 21 correspond to other drive sources.

For example, the axle drive system 101 can be used for a hybrid vehicle.

The "MG" means a motor generator having both a function as a motor for generating torque and a function as a generator for generating electric power by receiving torque. That is, the MG is synonymous with a rotating electrical machine. According to the first embodiment, each of the first MG 11 and the second MG 21 is a permanent magnet three-phase synchronous motor. The first MG 11 functions mainly as a generator, and the second MG 21 functions mainly as a motor.

The first MG 11 and the second MG 21 are connected to the force transmission mechanism 80. Although not shown in the drawings, the force transmission mechanism 80 is configured as a well-known planetary gear train having a sun gear, a ring gear, and a planetary carrier. The sun gear is connected to a rotary shaft 81 of the first MG 11, the ring gear is connected to a rotary shaft 82 of the second MG 21, and the planetary carrier is connected to a crank shaft of the engine 51. Thus, the rotary shaft 81 of the first MG 11 and the rotary shaft 82 of the second MG 21 are mechanically connected to each other through the force transmission mechanism 80.

When the planetary carrier rotates with the sun gear and the ring gear, drive force of the engine 51 is divided into two forces and transmitted through separate paths to the first MG 11 and the second MG 21. Since the drive force of the engine 51 is divided by the force transmission mechanism 80, the force transmission mechanism 80 can be referred to as the "force division mechanism".

In the force transmission mechanism 80, when rotation speeds of two of three axes, i.e., the sun gear, the ring gear, and the planetary carrier are determined, a rotation speed of the other axis is determined. That is, as shown in a collinear diagram of FIG. 2, a rotation speed Ng of the first MG 11, a rotation speed Ne of the engine 51, and a rotation speed Nm of the second MG 21 are connected together by a straight line on the collinear diagram. The rotation speed Ne of the engine 51 is determined by internally dividing a line segment from the rotation speed Ng of the first MG 11 to the rotation speed Nm of the second MG 21 in the ratio of 1:$\rho$, where $\rho$ represents a gear ratio of the number of teeth of the sun gear to the number of teeth of the ring gear.

A state when the rotation speeds Ng, Ne, and Nm are greater than 0 [rpm] is referred to as the "forward rotation", and a state when the rotation speeds Ng, Ne, and Nm are smaller than 0 [rpm] is referred to as the "reverse rotation".

The rotary shaft 82 of the second MG 21 is connected to the axle 92 through a reduction gear 91 such as a transmission so that torque Tmm exerted on the rotary shaft 82 of the second MG 21 can be transmitted to the axle 92. The rotation speed Np of the axle 92 is given as follows: Np=(1/K)×Nm, where K represents a gear ratio of the reduction gear 91. Torque Tmp exerted on the axle 92 is given as follows: Tmp=K×Tmm. When the axle 92 rotates, a vehicle wheel 93 rotates so that the vehicle body 90 can be propelled. The wheel 93 can be either a front wheel or a rear wheel.

To be precious, Torque Tp exerted on the wheel 93 is the sum of torque Tep and the torque Tmp. That is, Tp=Tep+Tmp. The direct torque Tep is transmitted to the axle 92 by the engine 51 and the first MG 11. The torque Tmp is transmitted to the axle 92 from the second MG 21. The torque Tep and the torque Tmp are hereinafter referred to as the "direct torque Tep" and the "transmission torque Tmp", respectively.

Torque Tem, which is generated by engine torque Te and first MG torque Tg, exerted on the rotary shaft 82 of the second MG 21 is given as follows: Tem=(1/K)×Tep. Torque Tmm exerted on the rotary shaft 82 by the second MG 21 itself is given as follows: Tmm=(1/K)×Tmp.

Figure 2:
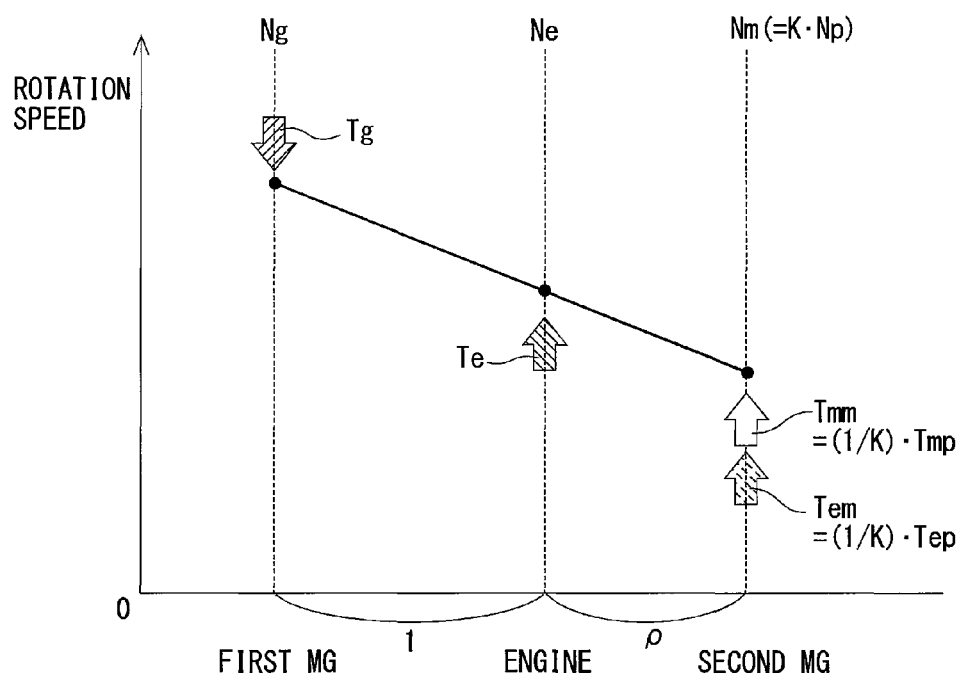
FIG. 2 is a collinear diagram for explaining a behavior of the axle drive system including the rotating electrical machine drive system according to the first embodiment.

The direct torque Tep is described in detail below. When the first MG1 generates negative torque Tg with respect to the engine torque Te, the first MG1 generates electric power. At this time, as shown in FIG. 2, reaction force of the first MG torque Tg with respect to the engine torque Te is transmitted as the direct torque Tep to the axle 92 by the principle of leverage given that the first MG 11 is a point of effort, the engine 51 is a fulcrum, and the second MG 21 is a point of load. In other words, the engine torque Te is divided by the force transmission mechanism 80 is divided into the direct torque Tep and torque used to generate electric power. In this way, according to the first embodiment, the engine 51 and the second MG 21 as multiple drive sources apply drive forces Dr11 and Dr21 to the axle 92, respectively.

The battery 6 is a rechargeable power storage device such as an electric double-layer capacitor or a secondary battery such as a lithium-ion battery or a nickel hydride battery. The battery 6 is changed with electric power generated by the first MG 11 within a range where the state of charge (SOC) of the battery 6 is not greater than a predetermined charge limit value.

The battery 6 is connected to first and second MG inverters 12 and 22 (refer to FIG. 3) of the control apparatus 201 and exchange electric power with the first and second MGs 11 and 21 through the first and second MG inverters 12 and 22, respectively. Specifically, AC power generated by the first MG 11 is converted to DC power by the first MG inverter 12 and then stored in the battery 6. DC power of the battery 6 is converted to AC power by the second MG inverter 22 and then supplied to the second MG 21.

For example, a vehicle control circuit 7 is configured as a microcomputer and includes a CPU, a ROM, and an I/O that are connected through buses. The vehicle control circuit 7 controls the whole of the motor-operated vehicle by software by executing prestored programs using the CPU or by hardware using a specific electronic circuit.

The vehicle control circuit 7 is capable of receiving signals from sensors and switches. For example, the vehicle control circuit 7 can receive a brake signal from a brake sensor (not shown), an accelerator signal from an accelerator sensor (not shown), a shift signal from a shift switch (not shown), and a speed signal from a vehicle speed sensor (not shown). The vehicle control circuit 7 detects operating conditions of the vehicle based on the received signals and outputs a torque command value trq* to the control apparatus 201 according to the operating conditions. Further, the vehicle control circuit 7 outputs a command signal to an engine control circuit (not shown) that controls operations of the engine 51.

A detailed structure of the rotating electrical machine drive system 1 is described below with reference to FIG. 3. In addition to the first MG 11, the second MG 21, the battery 6, and the control apparatus 201, the rotating electrical machine drive system 1 further includes a rotation angle sensor 14, control current sensors 17 and 18, a rotation angle sensor 24, and control current sensors 27 and 28. The rotation angle sensor 14 and the control current sensors 17 and 18 are used for the first MG 11. The rotation angle sensor 24 and the control current sensors 27 and 28 are used for the second MG 21.

The control apparatus 201 includes two control blocks: a first MG control block and a second MG control block. The first MG control block is used for control of the first MG 11 and includes the first MG inverter 12, a controller 15, a rotation speed calculator 13, and an abnormality determinator 16. The second MG control block is used for control of the second MG 21 and includes the second MG inverter 22, a controller 25, a rotation speed calculator 23, and an abnormality determinator 26.

The first MG control block is configured in the same manner as the second MG control block. Further, the rotation angle sensor 14 and the control current sensors 17 and 18, which are used for the first MG 11, are configured in the same manner as the rotation angle sensor 24 and the control current sensors 27 and 28, which are used for the second MG 21. Therefore, the second MG control block, the rotation angle sensor 24, and the control current sensors 27 and 28 are explained as an example.

In FIG. 3, variables related to the first MG 11 are indicated with parentheses, and variables related to the second MG 21 are indicated with no parenthesis. For example, an electrical angle related to the first MG 11 is indicated as "(θe)", and an electrical angle related to the second MG 21 is indicated as "θe".

DC power of the battery 6 is stepped up by a step-up converter (not shown) and then inputted as a system voltage VH to the inverter 22. The inverter 22 includes six switching devices (not shown) connected in a bridge configuration. Examples of the switching device include an insulated-gate bipolar transistor (IGBT), a metal oxide semiconductor (MOS) transistor, and a bipolar transistor. The switching devices are controlled (i.e., turned ON and OFF) based on PWM signals UU, UL, VU, VL, WU, and WL outputted from a PWM signal generator 35 (refer to FIG. 5) of the controller 25 so that the inverter 22 can control three-phase AC voltages vu, vv, and vw applied to the second MG 21. The second MG 21 is controlled (i.e., driven) by the three-phase AC voltages vu, vv, and vw generated and applied by the inverter 22.

For example, the controller 25 is configured as a microcomputer and includes a CPU, a ROM, and an I/O that are connected through buses. The controller 25 controls operations of the second MG 21 by software by executing prestored programs using the CPU or by hardware using a specific electronic circuit.

The rotation angle sensor 24 is located near a rotor (not shown) of the second MG 21. The rotation angle sensor 24 detects an electrical angle θe and outputs the electrical angle θe to the controller 25. According to the first embodiment, the rotation angle sensor 24 is a resolver. Alternatively, the rotation angle sensor 24 can be a rotary encoder or the like.

The rotation speed calculator 23 calculates the rotation speed Nm of the second MG 21 based on the electrical angle θe detected by the rotation angle sensor 24. It is noted that the rotation speed Nm is a rotation speed of a rotor of the second MG 21.

The control current sensor 27 is provided to any one of three phases of the second MG 21 to detect and output a "phase current detection value used for control" to the controller 25. The control current sensor 28 is provided to one of the others of the three phases of the second MG 21 to detect and output a "phase current detection value used for control" to the controller 25. According to the first embodiment, the control current sensor 27 is provided to a V-phase of the second MG 21 to detect a V-phase current detection value iv_sns, and the control current sensor 28 is provided to a W-phase of the second MG 21 to detect a W-phase current detection value iw_sns.

Three phase currents satisfy Kirchhoff's law: $iu+iv+iw=0$ (1).

Therefore, a U-phase current value can be calculated from the V-phase and W-phase current detection values.

Alternatively, one of the control current sensors 27 and 28 can be provided to the U-phase of the second MG 21 instead of the V-phase or the W-phase.

The "phase current detection value used for control" is a phase current detection value based on which a feedback control is performed to calculate a voltage command applied to the second MG inverter 22. Each of the control current sensors 27 and 28 detects the "phase current detection value used for control". A monitor current sensor specialized to monitor whether the control current sensors 27 and 28 are normal or abnormal can be added. For example, a "two-phase two-channel configuration" in which two current sensors, i.e., both the control current sensor and the monitor current sensor are provided to each of the V-phase and the W-phase can be employed, or a "three-phase one-channel configuration" in which the control current sensor is provided to each of the V-phase and the W-phase, and the monitor current sensor is provided to the U-phase can be employed. It is noted that the monitor current sensor is not shown in FIG. 3.

In each rotating electrical machine, when a phase current detected by the control current sensor is available for the "phase current detection value used for control", the phase is referred to as an "effective sensor-phase". For example, when each of the control current sensors 27 and 28 is normal, the number of effective sensor-phases of the second MG 21 is two.

The abnormality determinator 26 obtains the phase current detection values detected by the control current sensors 27 and 28. For example, the abnormality determinator 26 makes a determination of whether the control current sensors 27 and 28 are normal or abnormal by comparing the phase current detection values detected by the control current sensors 27 and 28 with the phase current detection value detected by the monitor current sensor (not shown) and outputs a determination signal indicative of a result of the determination to the controller 25.

When each of the control current sensors 27 and 28 is normal, the number of the effective sensor-phases of the second MG 21 is two. Therefore, the control apparatus 201 can perform a two-phase control for controlling the second MG 21 based on the two phase current detection values. In contrast, when one of the control current sensors 27 and 28 is abnormal, the number of the effective sensor-phases of the second MG 21 is one. In this case, the control apparatus 201 cannot perform the two-phase control. A process performed by the control apparatus 201 when one of the control current sensors 27 and 28 is abnormal is described in detail later.

A structure for the first MG 11 is the same as the structure described above for the second MG 21. The first MG controller 15 and the second MG controller 25 exchange signals with each other.

Based on the rotation speed Ng of the first MG 11, the rotation speed Nm of the second MG 21, and the torque command value trq* received from the vehicle control circuit 7, the control apparatus 201 causes the second MG 21 mainly to consume power by performing a motoring operation as a motor and causes the first MG 11 mainly to generate power by performing a regeneration operation as a generator. Specifically, the control apparatus 201 operates in one of the following four modes based on signs (i.e., positive or negative) of the rotation speeds Ng and Nm, and a sign of the torque command value trq*.

<First mode> forward rotation/forward torque (motoring)
<Second mode> forward rotation/reverse torque (regeneration)
<Third mode> reverse rotation/reverse torque (motoring)
<Fourth mode> reverse rotation/forward torque (regeneration)

Regarding mainly the second MG 21, when the rotation speed Nm is positive (i.e., forward rotation) and the torque command value trq* is positive, or when the rotation speed Nm is negative (i.e., reverse rotation) and the torque command value trq* is negative, the second MG inverter 22 converts DC power supplied from the battery 6 to AC power and drives the second MG 21 with the AC power. Thus, the second MG 21 performs the motoring operation as a motor and outputs torque.

Regarding mainly the first MG 11, when the rotation speed Ng is positive (i.e., forward rotation) but the torque command value trq* is negative, or when the rotation speed Ng is negative (i.e., reverse rotation) but the torque command value trq* is positive, the first MG inverter 11 converts AC power generated by the first MG 11 to DC power and supplies the DC power to the battery 6. Thus, the first MG 11 performs the regeneration operation as a generator and generates power.

For example, in the second MG 21, even when the abnormality determinator 26 determines that one of the control current sensors 27 and 28 is abnormal, the control apparatus 201 can perform a one-phase control for controlling the second MG 21 based on the phase current detection value of the other of the control current sensors 27 and 28. However, the one-phase control uses a current estimation value. Therefore, compared to the two-phase control, the one-phase control reflects less actual information. A disadvantage of the one-phase control observed, in particular, at low rotation speed is described below with reference to FIGS. 4A-4C.

Figure 4A:
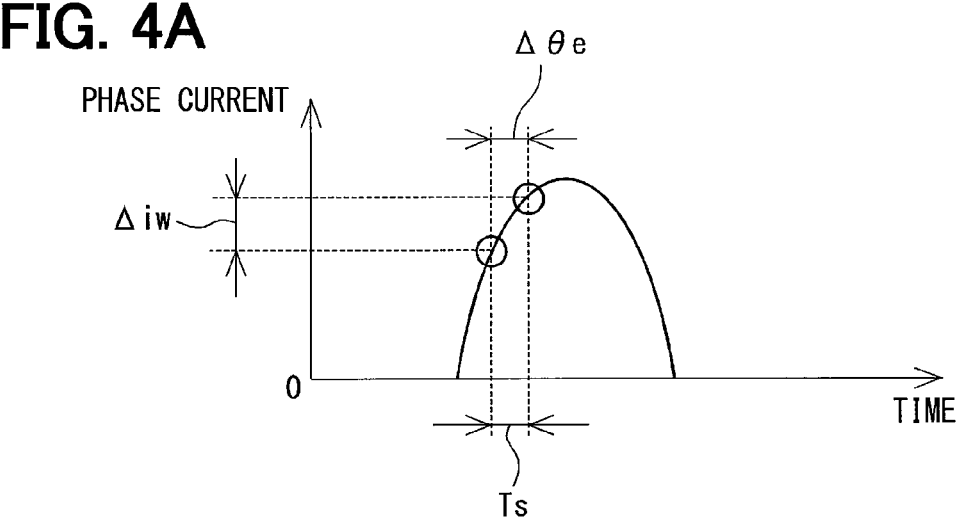
FIGS. 4A, 4B, and 4C are diagrams illustrating a phase current waveform for explaining a problem of a one-phase control occurring when a rotation speed of a rotating electrical machine is low.
Figure 4B:
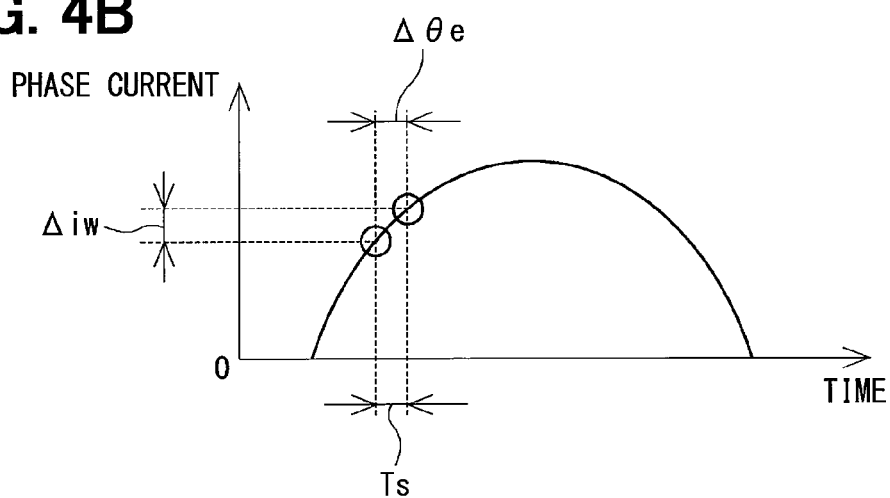
Figure 4C:
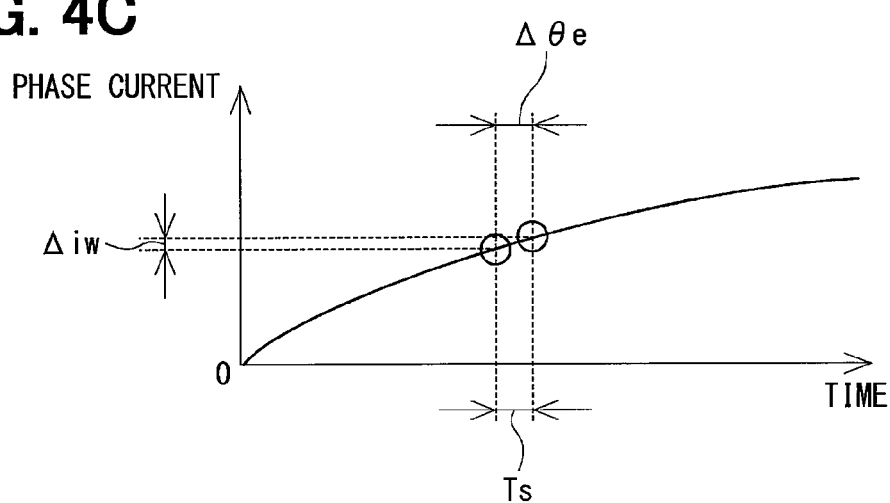

FIGS. 4A-4C show a waveform of the W-phase current and illustrates a relationship among a sampling interval Ts, an electrical angle change $\Delta\theta e$, and a current change $\Delta iw$. FIG. 4A shows the waveform of the W-phase current at high rotation speed of the second MG 21, FIG. 4B shows the waveform of the W-phase current at middle rotation speed of the second MG 21, and FIG. 4C shows the waveform of the W-phase current at low rotation speed of the second MG 21. The sampling interval Ts is a time interval at which the control current sensor detects the phase current. The terms "low rotation speed", "middle rotation speed", and "high rotation speed" are used in a relative sense and are not meant to describe concrete rotation speeds of the second MG 21. The sampling interval Ts is kept constant regardless of the rotation speed Nm of the second MG 21.

At the high rotation speed, since the electrical angle change $\Delta\theta e$ and the current change $\Delta iw$ in the sampling interval Ts are relatively large, actual information is suitably reflected so that the one-phase control can be performed with suitable accuracy.

At the middle rotation speed, since the electrical angle change $\Delta\theta e$ and the current change $\Delta iw$ in the sampling interval Ts are smaller than those at the high rotation speed, the actual information is reduced so that the accuracy of the one-phase control can be reduced.

At the low rotation speed, the electrical angle change $\Delta\theta e$ and the current change $\Delta iw$ in the sampling interval is are much smaller than those at the high rotation speed, and the current change $\Delta iw$ becomes almost zero. Therefore, the accuracy of the one-phase control is further reduced due to insufficient actual information. As a result, control of the second MG 21 may become unstable.

For example, according to a one-phase control technique disclosed in JP-A-2008-86139, a current feedback control is performed by treating current command values of two phases, other than a sensor-phase, out of three phase current command values, which are obtained by inverse dq transformation of d-axis and q-axis current commands, as estimations values. In this technique, when the electrical angle change $\Delta\theta e$ and the current change $\Delta iw$ become small, less actual information is reflected in a current estimation value so that accuracy of the current estimation value can be reduced. As result, control of the rotating electrical machine may become unstable.

To prevent such a disadvantage of a one-phase control, according to the first embodiment, the control apparatus 201 switches drive modes of the rotating electrical machine based on whether the number of the effective sensor-phases is one or two. Further, when the number of the effective sensor-phases is one, the control apparatus 201 switches the drive modes based on a result of a comparison between the rotation speed of the rotating electrical machine and a threshold value.

Figure 12:
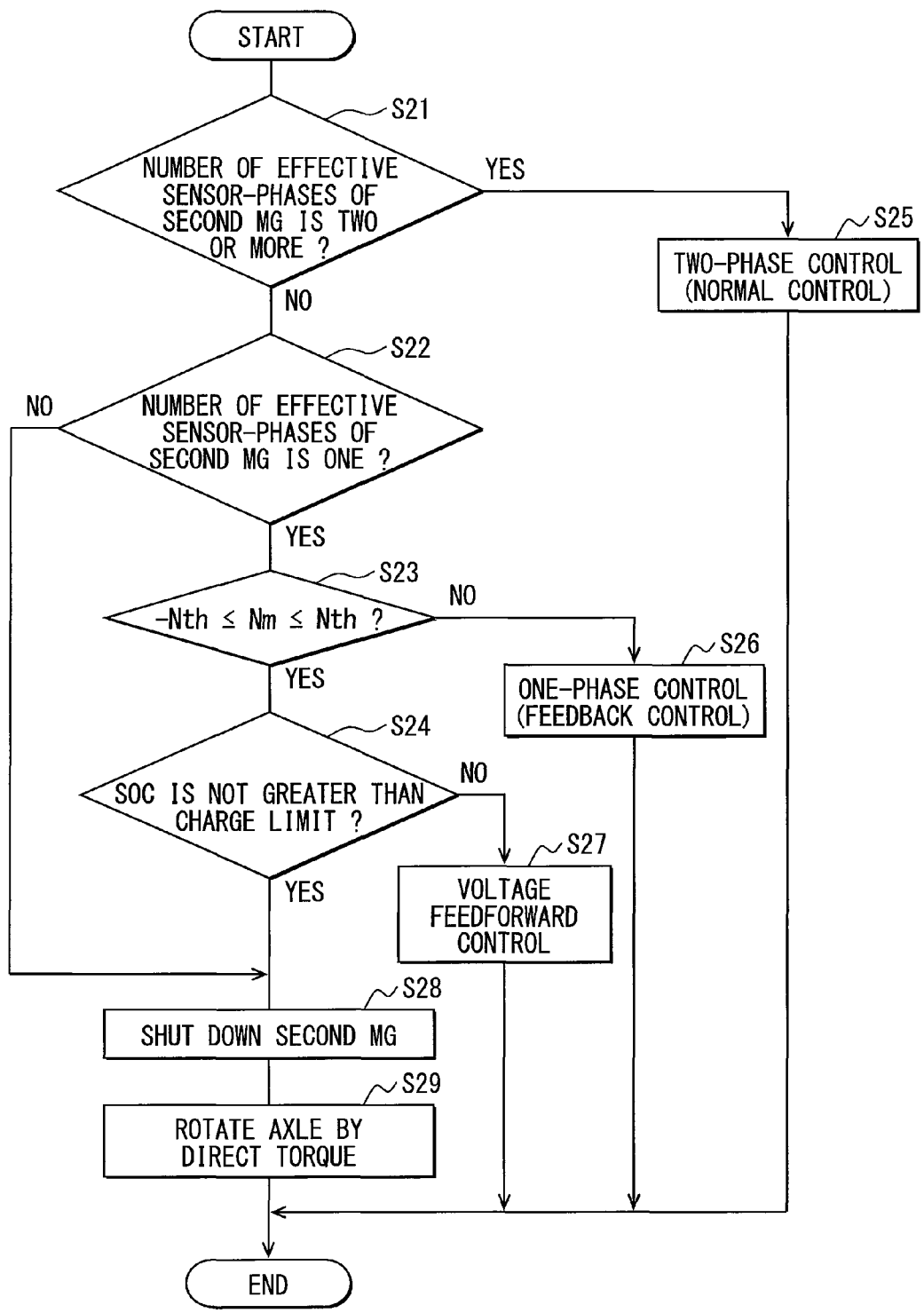
FIG. 12 is a flowchart of a determination process for determining the drive mode of the second MG in the rotating electrical machine drive system according to the first embodiment.
Figure 16:
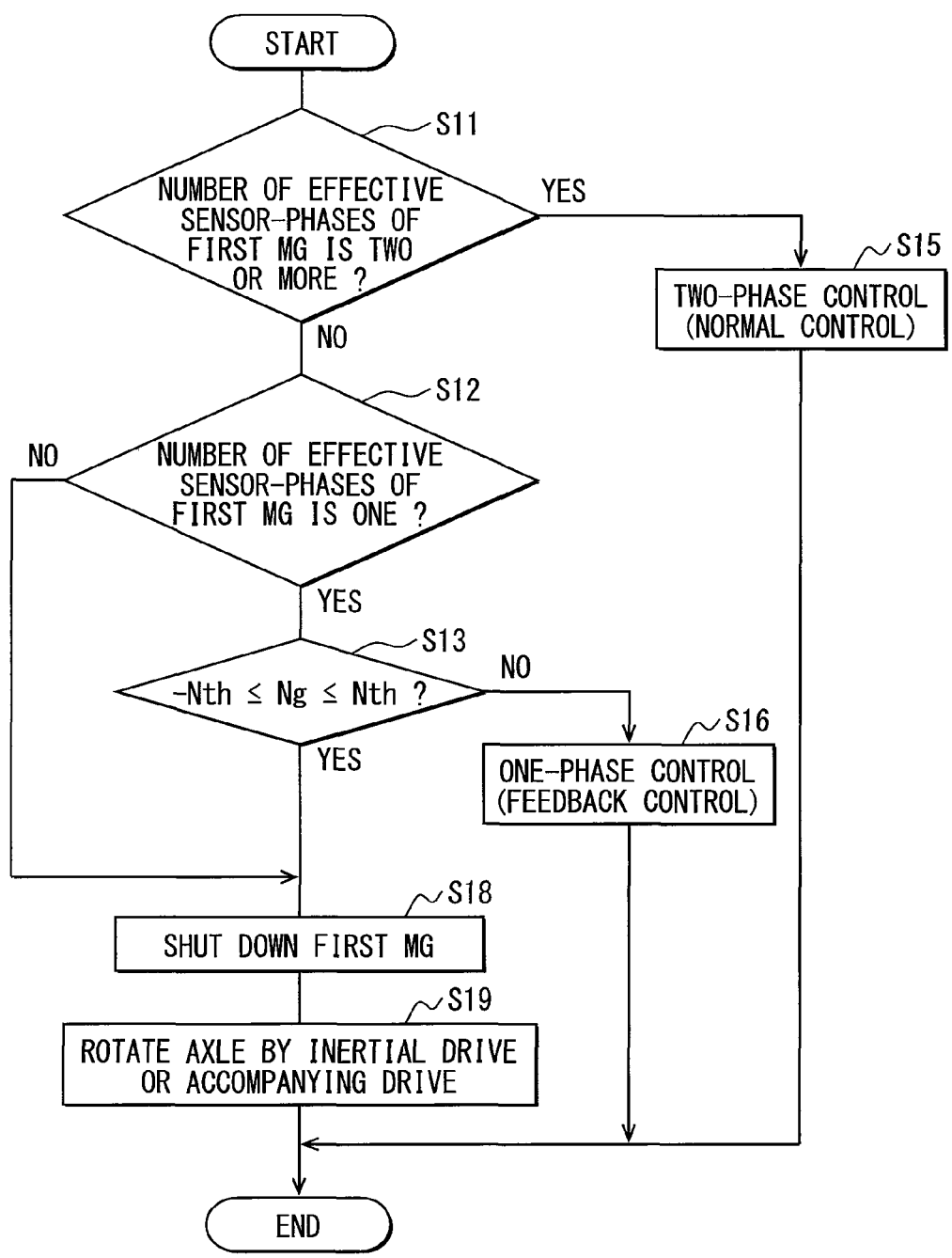
FIG. 16 is a flowchart of a determination process for determining a drive mode of the first MG in the rotating electrical machine drive system according to the first embodiment.

A configuration of the second MG controller 25 of the control apparatus 201 for each drive mode is described below with reference to FIGS. 5-7. It is noted that the first MG controller 15 is configured in the same manner as the second MG controller 25. A determination process for switching the drive mode is described later with reference to a flow chart (FIGS. 12 and 16).

(Two-Phase Control Mode)

Figure 5:
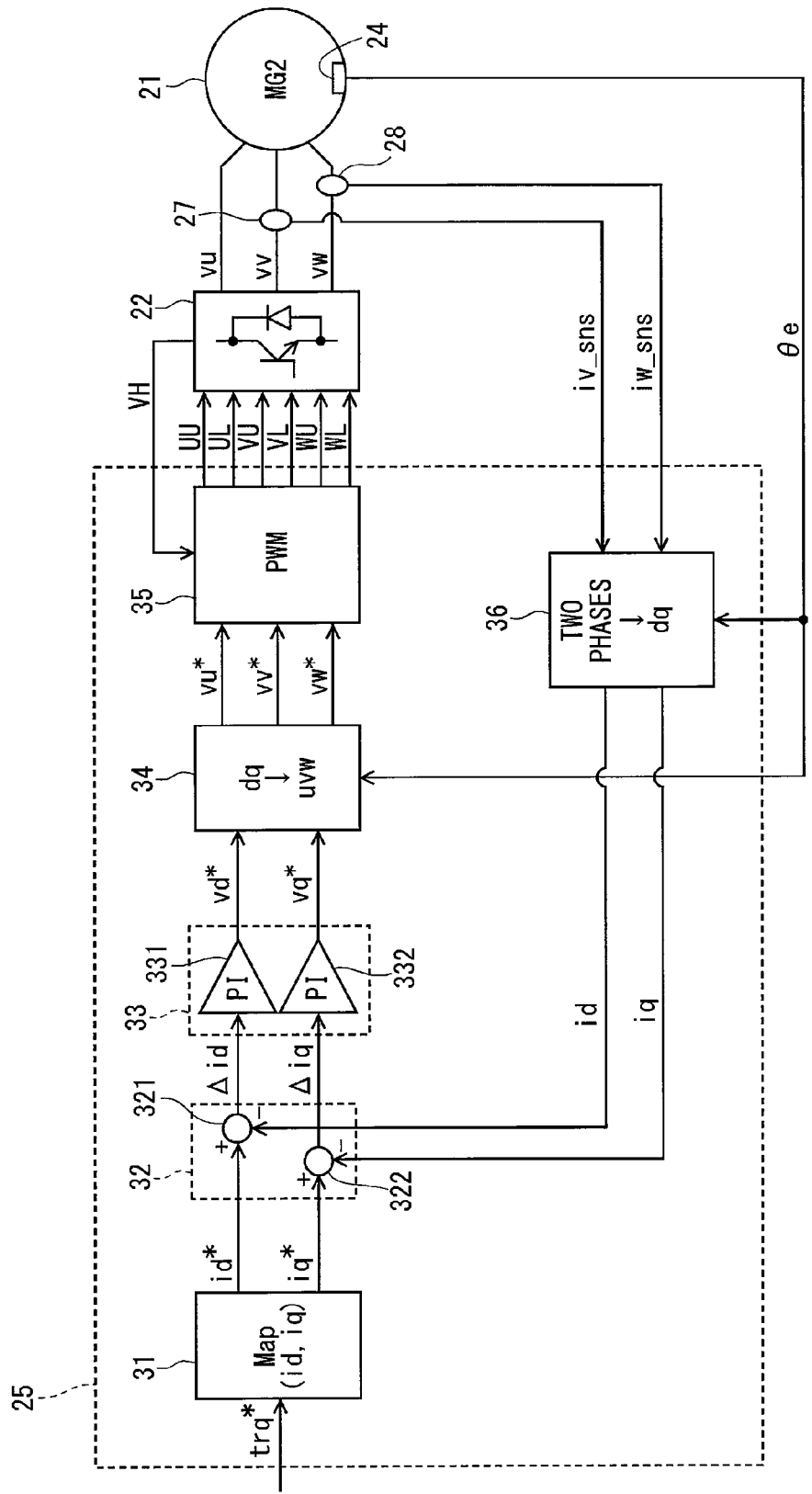
FIG. 5 is a block diagram of a controller to drive a second MG by a two-phase control.

When the number of the effective sensor-phases is two or more, the second MG controller 25 is configured in a manner as shown in FIG. 5 to drive the second MG 21 by the two-phase control. When the number of the effective sensor-phases is two, a current of the other phase can be calculated from Kirchhoff's law (refer to the formula (1)). Therefore, when the number of the effective sensor-phases is two, the two-phase control is performed in the same manner as when the number of the effective sensor-phases is three.

As shown in FIG. 5, the second MG controller 25 includes a current command calculator 31, a current subtractor 32, a PI calculator 33, and inverse dq transformer 34, a PWM signal generator 35, and a dq transformer 36.

The current command calculator 31 calculates a d-axis current command value id* and a q-axis current command value iq* in a rotating coordinate system (d-q coordinate system) of the second MG 21 based on the torque command trq* received from the vehicle control circuit 7.

According to the first embodiment, the d-axis and q-axis current command values id* and iq* are calculated by referring to a prestored map. Alternatively, the d-axis and q-axis current command values id* and iq* can be calculated from a formula or the like.

The subtractor 32 includes a d-axis current subtractor 321 and a q-axis current subtractor 322. The d-axis current subtractor 321 calculates a d-axis current deviation $\Delta id$. The d-axis current deviation $\Delta id$ is a difference between a d-axis current value id, which is calculated by the dq transformer 36 and fed back, and the d-axis current command value id*. The q-axis current subtractor 322 calculates a q-axis current deviation $\Delta iq$. The q-axis current deviation $\Delta iq$ is a difference between a q-axis current value iq, which is calculated by the dq transformer 36 and fed back, and the q-axis current command value iq*.

The PI calculator 33 includes a d-axis PI calculator 331 and a q-axis PI calculator 332. The d-axis PI calculator 331 calculates a d-axis voltage command value vd* by PI calculation so that the d-axis current deviation $\Delta id$ can converge to zero, thereby causing the d-axis current value id to follow the d-axis current command value id*. The q-axis PI calculator 332 calculates a q-axis voltage command value vq* by PI calculation so that the q-axis current deviation Δiq can converge to zero, thereby causing the q-axis current value iq to follow the q-axis current command value iq*.

The inverse dq transformer 34 converts the d-axis and q-axis voltage command values vd* and vq* to a U-phase voltage command value vu*, a V-phase voltage command value vv*, and a W-phase voltage command value vw* based on the electrical angle θe received from the rotation angle sensor 24.

The PWM signal generator 35 calculates PWM signals UU, UL, VU, VL, WU, and WL based on the three-phase voltage command values vu*, vv*, and vw* and the system voltage VH applied to the second MG inverter 22.

The switching devices of the second MG inverter 22 are turned ON and OFF based on the PWM signals UU, UL, VU, VL, WU, and WL so that the three-phase AC voltages vu, vv, and vw can be generated. The three-phase AC voltages vu, vv, and vw are applied to the second MG 21 to control the second MG 21 so that the second MG 21 can output torque corresponding to the torque command value trq*.

The dq transformer 36 converts the V-phase and W-phase current detection values iv_sns and iw_sns detected by the control current sensors 27 and 28 to the d-axis and q-axis current values id and iq based on the electrical angle θe received from the rotation angle sensor 24. The dq transformer 36 feds back the d-axis and q-axis current values id and iq to the current subtractor 32. A dq transformation based on the two phase current detection values is explained below. The following formula (2.1) represents a general expression for a dq transformation based on three phase currents.

$$\begin{bmatrix} id \\ iq \end{bmatrix} = \sqrt{\frac{2}{3}} \begin{bmatrix} \cos(\theta e) & \cos(\theta e - 120°) & \cos(\theta e + 120°) \\ -\sin(\theta e) & -\sin(\theta e - 120°) & -\sin(\theta e + 120°) \end{bmatrix} \begin{bmatrix} iu \\ iv \\ iw \end{bmatrix} \quad (2.1)$$

The following formula (2.2) can be obtained by substituting iu=−iv−w, which is derived from Kirchhoffs law (refer to the formula (1)), into the formula (2.2).

$$\begin{bmatrix} id \\ iq \end{bmatrix} = \sqrt{\frac{2}{3}} \begin{bmatrix} \cos(\theta e - 120°) - \cos(\theta e) & \cos(\theta e + 120°) - \cos(\theta e) \\ -\sin(\theta e - 120°) + \sin(\theta e) & -\sin(\theta e + 120°) + \sin(\theta e) \end{bmatrix} \begin{bmatrix} iv\_sns \\ iw\_sns \end{bmatrix} \quad (2.2)$$

$$= \sqrt{\frac{2}{3}} \times \sqrt{3} \begin{bmatrix} -\cos(\theta e + 30°) & \cos(\theta e + 150°) \\ \sin(\theta e + 30°) & -\sin(\theta e + 150°) \end{bmatrix} \begin{bmatrix} iv\_sns \\ iw\_sns \end{bmatrix}$$

$$= \sqrt{2} \begin{bmatrix} -\sin(\theta e + 120°) & \sin(\theta e - 120°) \\ -\cos(\theta e + 120°) & \cos(\theta e - 120°) \end{bmatrix} \begin{bmatrix} iv\_sns \\ iw\_sns \end{bmatrix}$$

As described above, when two phase current detection values are detected, the feedback d-axis and q-axis current values accurately reflect actual information. Therefore, the second MG 21 can be stably controlled regardless of the rotation speed Nm of the second MG 21.

(One-Phase Control Mode)

Figure 6:
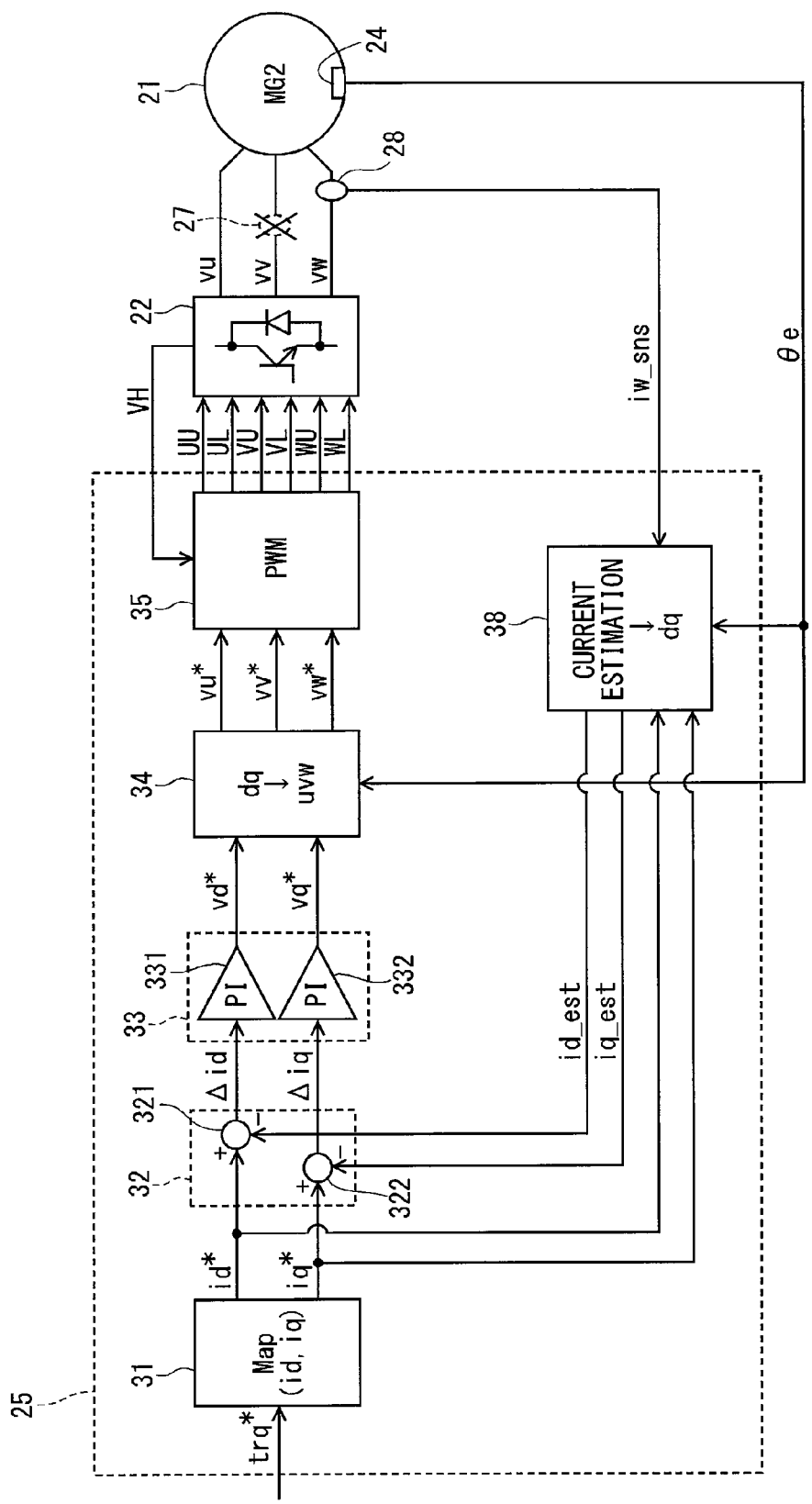
FIG. 6 is a block diagram of the controller to drive the second MG by a one-phase control.

When the number of the effective sensor-phases is one, and the rotation number Nm of the second MG 21 rotating in a forward direction is greater than a positive rotation threshold value Nth, or when the number of the effective sensor-phases is one, and the rotation number Nm of the second MG 21 rotating in a reverse direction is smaller than a negative rotation threshold value −Nth, the second MG controller 25 is configured in a manner as shown in FIG. 6 to drive the second MG 21 by the one-phase control.

In the one-phase control, a current estimation value estimated based on a current detection value of one phase is fed back, and energization of the second MG 21 is controlled based on the feedback current estimation value. For example, when the effective sensor-phase is the W-phase, the electrical angle change Δθe and the current change Δiw in the sampling interval Ts are relatively large at relatively high rotation speed. Therefore, actual information is suitably reflected in the feedback current estimation value so that the second MG 21 can be stably driven by the one-phase control. The two-phase control mode and the one-phase control mode are hereinafter referred to collectively as the "current feedback control mode".

FIG. 6 shows an example where the control current sensor 27 for the V-phase is abnormal, and the control current sensor 28 for the V-phase is normal. Also, the example shown in FIG. 6 can correspond to a case where the control current sensor 27 for the V-phase is not originally provided.

The configuration shown in FIG. 6 differs from the configuration shown in FIG. 5 in that the dq transformer 36 is replaced with a current estimator 38, the V-phase current detection value iv-sns is not detected, and the d-axis and q-axis current command values id* and iq* are inputted to the current estimator 38. These differences are described in detail below.

The current estimator 38 estimates d-axis and q-axis current estimation values id_est and iq_est based on the W-phase current detection value iw_sns, the electrical angle θe, and the d-axis and q-axis current command values id* and iq*. The d-axis and q-axis current estimation values id_est and iq_est are fed back to the current subtractor 32.

According to the first embodiment, the current estimator 38 estimates the d-axis and q-axis current estimation values id_est and iq_est by using a conventional technique disclosed in JP-A-2008-86139. That is, U-phase and V-phase current command values, out of three phase current command values obtained by inverse dq transformation of the d-axis and q-axis current command values id* and iq*, are used as U-phase and V-phase current estimation values iu_est and iv_est. Then, the d-axis and q-axis current estimation values id_est and iq_est are calculated by dq transformation of the W-phase current detection value iw_sns and the U-phase and V-phase current estimation values iu_est and iv_est.

A method, by which the current estimator 38 estimates one or two phase current estimation values based on the above inputted information, is not limited to those disclosed in JP-A-2008-86139. The other estimation methods are described as modifications in the end of the description.

(Voltage Feedforward Control Mode)

Figure 7:
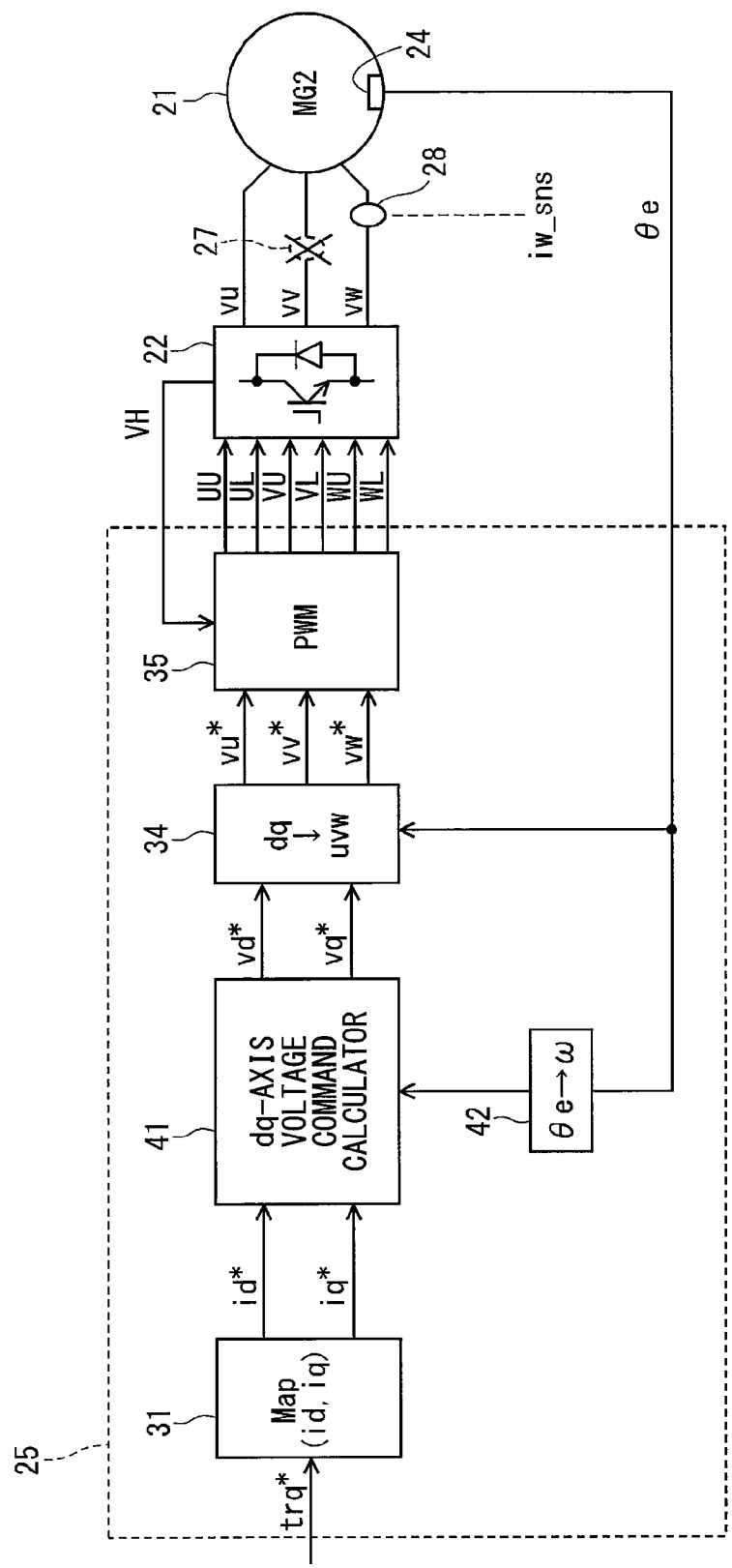
FIG. 7 is a block diagram of the controller to drive the second MG by a voltage feedforward control.

When the number of the effective sensor-phases is one, and the rotation number Nm of the second MG 21 rotating in a forward direction is not greater than the positive rotation threshold value Nth, or when the number of the effective sensor-phases is one, and the rotation number Nm of the second MG 21 rotating in a reverse direction is not less than the negative rotation threshold value −Nth, the second MG controller 25 is configured in a manner as shown in FIG. 7 to drive the second MG 21 by a voltage feedforward control based on the d-axis and q-axis current command values id* and iq* and machine constants of the second MG 21.

A range of the rotation speed Nm of the second MG 21 from the negative rotation threshold value −Nth inclusive to the positive rotation threshold value Nth inclusive is hereinafter referred to as the "designated low rotation speed range LRA". The designated low rotation speed range LRA includes zero.

When the rotation speed Nm of the second MG 21 is in the designated low rotation speed range LRA, an electrical angular velocity ω is substantially regarded as zero (i.e., ω≈0). In the designated low rotation speed range LRA, since the electrical angle change Δθe and the current change Δiw in the sampling interval Ts are almost zero, the amount of actual information becomes insufficient for the one-phase control. As a result, control of the second MG 21 may become unstable. Therefore, the second MG 21 is controlled by the voltage feedforward control instead of the one-phase control.

As shown in FIG. 7, the second MG controller 25 does not include the current subtractor 32, the PI calculator 33, the dq transformer 36, and the current estimator 38 which are used in the current feedback control mode. Instead, the second MG controller 25 includes a dq-axis voltage command calculator 41 and an angular velocity calculator 42 for calculating a feedforward voltage command.

The dq-axis voltage command calculator 41 calculates the d-axis and q-axis voltage command values vd* and vq* by using voltage equations. In general, voltage equations of a motor are given by the following formulas (3.1) and (3.2).

$$vd = Ra \times id + Ld \times (d/dt)id - \omega \times Lq \times iq \quad (3.1)$$

$$vq = Ra \times iq + Lq \times (d/dt)iq + \omega \times Ld \times id + \omega \times \psi \quad (3.2)$$

In the formulas (3.1) and (3.2), Ra represents an armature resistance, Ld represents a d-axis self-inductance, Lq represents a q-axis self-inductance, ω represents an electrical angular velocity, and ψ represents an armature interlinkage magnetic flux of a permanent magnet.

The armature resistance Ra, the d-axis self-inductance Ld, the q-axis self-inductance Lq, and the armature interlinkage magnetic flux ψ are machine constants of the second MG 21. The machine constants can be fixed values or calculated values. For example, the machine constants can be calculated based on the torque command value trq* or the d-axis and q-axis current command values id* and iq* by using a map which is created in advance with actual measurement values or values having almost actual characteristics.

The formulas (3.1) and (3.2) can be respectively rewritten into the following formulas (4.1) and (4.2) by ignoring the time-derivative term (d/dt), by using the d-axis and q-axis current command values id* and iq* as the d-axis and q-axis current values id and iq, and by using the d-axis and q-axis voltage command values vd* and vq* as d-axis and q-axis voltage values vd and vq.

$$vd^* = Ra \times id^* - \omega \times Lq \times iq^* \quad (4.1)$$

$$vq^* = Ra \times iq^* + \omega \times Ld \times id^* + \omega \times \psi \quad (4.2)$$

Further, when the electrical angular velocity ω is substantially zero, the formulas (4.1) and (4.2) can be respectively rewritten into the following formulas (4.3) and (4.4). Thus, only the term of the armature resistance Ra is left. Therefore, the d-axis voltage command value vd* depends only on the d-axis current command value id*, and the q-axis voltage command value vq* depends only on the q-axis current command value iq*.

$$vd^* = Ra \times id^* \quad (4.3)$$

$$vq^* = Ra \times iq^* \quad (4.4)$$

The dq-axis voltage command calculator 41 obtains the electrical angular velocity ω from the angular velocity calculator 42, which converts the electrical angle θe to the electrical angular velocity ω. Then, when the dq-axis voltage command calculator 41 determines that the electrical angular velocity ω is substantially zero, the dq-axis voltage command calculator 41 calculates the d-axis and q-axis voltage command values vd* and vq* by using the formulas (4.3) and (4.4). Due to physical factors of the second MG 21 and the control apparatus 201, the voltage command values calculated by the dq-axis voltage command calculator 41 may deviate from command values for voltages necessary to be applied to the second MG 21 to cause the second MG 21 to output torque corresponding to the torque command value trq*. Therefore, the voltage command values calculated by using the formulas (4.3) and (4.4) can be further corrected, and the corrected voltage command values can be outputted as the d-axis and q-axis voltage command values vd* and vq* to the inverse dq transformer 34. For example, this correction can be performed by using the current detection value or the current command value of the effective sensor-phase.

Figure 8:
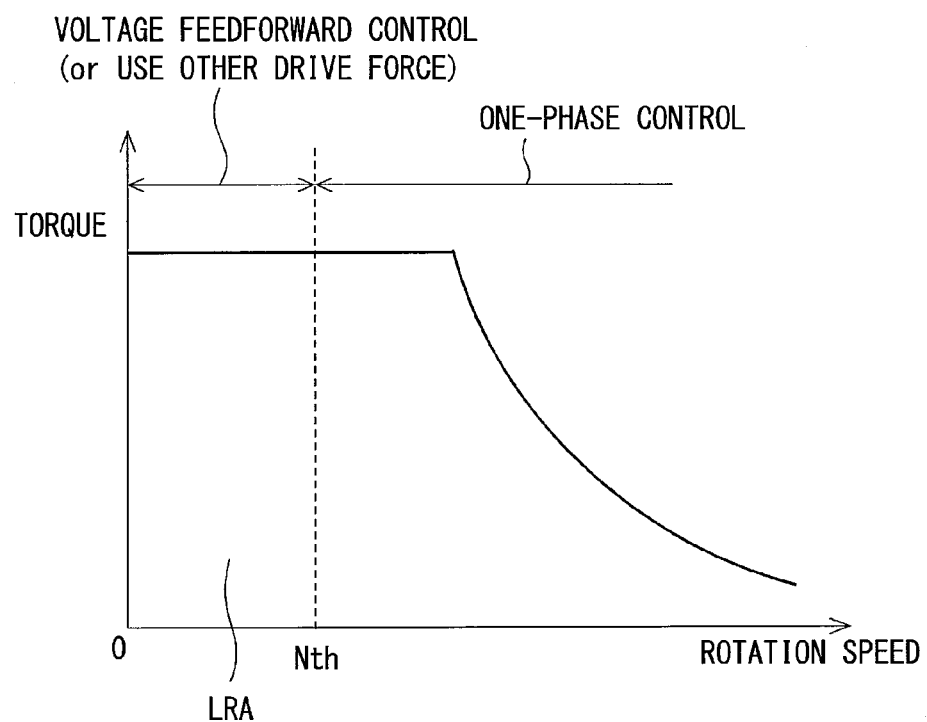
FIG. 8 is a diagram for explaining how to switch a drive mode based on the rotation speed according to the first embodiment.

As described above, when the second MG controller 25 drives the second MG 21 under a condition that the number of the effective sensor-phases is one, the second MG controller 25 switches the drive mode between the one-phase control and the voltage feedforward control based on whether the rotation speed Nm of the second MG 21 is in the designated low rotation speed range LRA. When the rotation speed Nm is positive, the drive mode is switched in a manner as shown in FIG. 8.

Next, a behavior of the rotating electrical machine drive system 1 observed when the number of the effective sensor-phases of the second MG 21 is one is described below with reference to FIGS. 9, 10, and 11.

Figure 9:
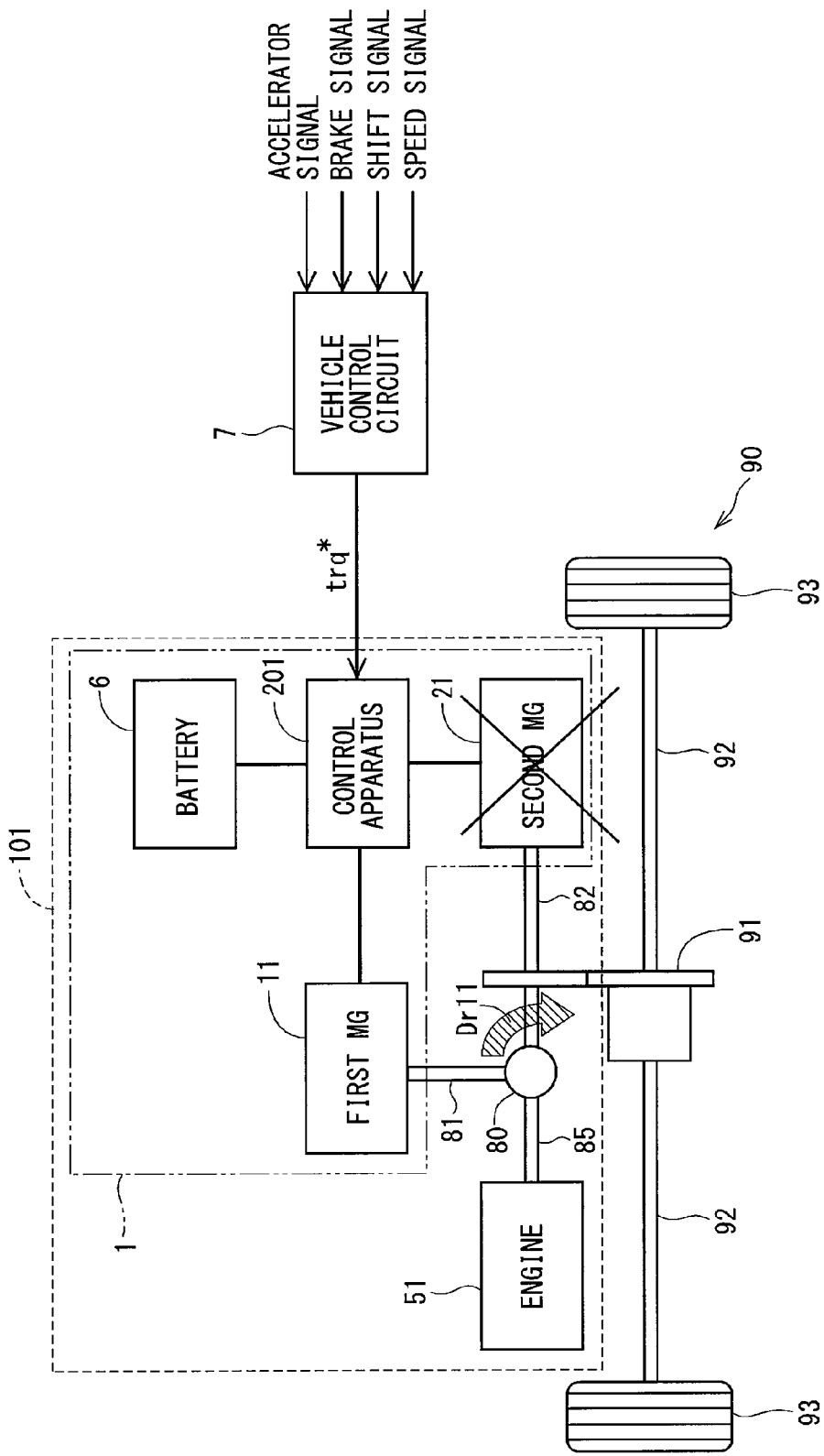
FIG. 9 is a diagram of the hybrid vehicle observed when the number of effective sensor-phases of the second MG is one in the rotating electrical machine drive system according to the first embodiment.

In FIG. 9, the symbol "X" on the second MG 21 indicates that one of the control current sensors 27 and 28 for the second MG 21 becomes abnormal, so that the number of the effective sensor-phases becomes one.

The rotating electrical machine drive system 1 increases the rotation speed Nm of the second MG 21 by using the drive force Dr12 of the second MG 21 as little as possible. That is, the rotating electrical machine drive system 1 increases the rotation speed Nm of the second MG 21 by using only the drive force Dr11, which is reaction force of the first MG 11 subjected to the engine torque Te. At this time, the first MG 11 generates electric power. Therefore, a case analysis based on whether the SOC of the battery 6 is not greater than the charge limit value is necessary.

Figure 10:
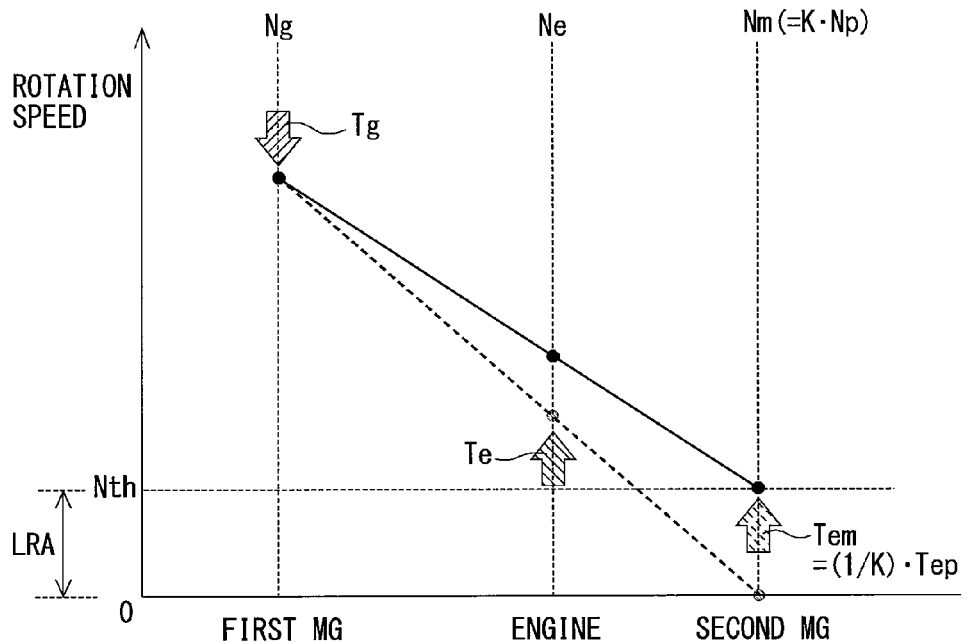
FIG. 10 is a collinear diagram observed when the number of effective sensor-phases of the second MG is one and a state of charge (SOC) of a battery is not greater than a charge limit value in the rotating electrical machine drive system according to the first embodiment.
Figure 11:
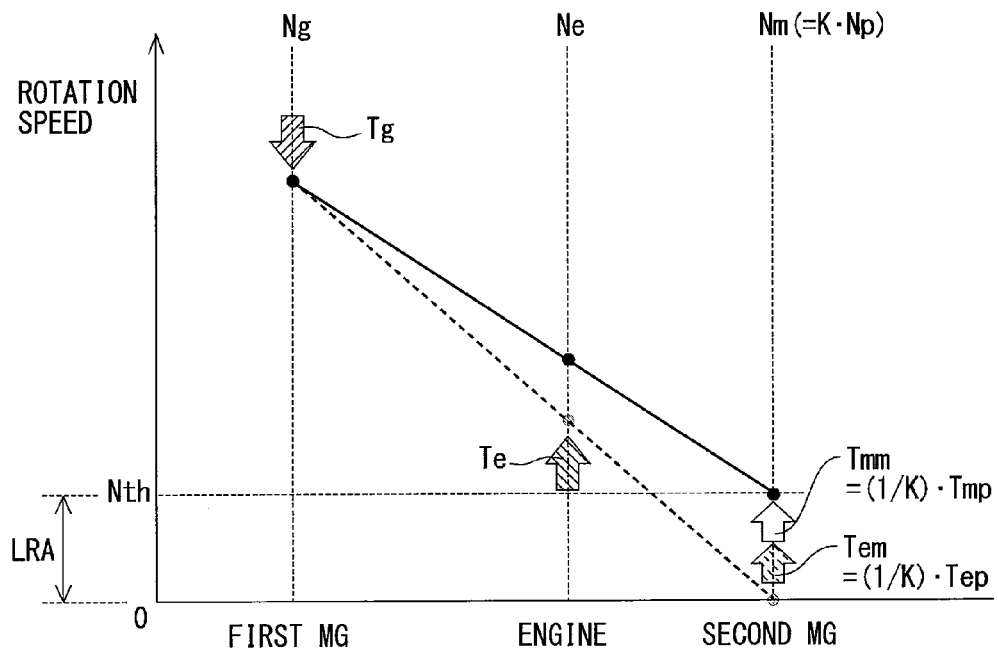
FIG. 11 is a collinear diagram observed when the number of effective sensor-phases of the second MG is one and the SOC of the battery is greater than the charge limit value in the rotating electrical machine drive system according to the first embodiment.

As indicated by a broken line in FIGS. 10 and 11, when the engine 51 and the first MG 11 rotate in a forward direction, and the second MG 21 stops, both the rotation speed Ne of the engine 51 and the rotation speed Ng of the first MG 11 are positive values greater than the positive rotation threshold value Nth, and the rotation speed Nm of the second MG 21 is zero. At this time, the first MG 11 is being driven by the two-phase control. A method for increasing the rotation speed Nm of the second MG 21 under this condition is described below.

If the SOC of the battery 6 is not greater than the charge limit value, the first MG 11 can generate electric power by receiving the engine torque Te. In this case, as shown in FIG. 10, when the rotation number Nm of the second MG 21 is not greater than the positive rotation threshold value Nth, the axle 92 is rotated by the direct torque Tep based on the engine torque Te. Then, as indicated by a solid line in FIG. 10, when the rotation speed Nm of the second MG 21 exceeds the positive rotation speed threshold value Nth, the drive mode is switched to the one-phase control.

In contrast, if the SOC of the battery 6 is greater than the charge limit value, the first MG 11 can generate electric power anymore. Therefore, as shown in FIG. 11, when the rotation number Nm of the second MG 21 is not greater than the positive rotation threshold value Nth, the second MG 21 is self-driven by the voltage feedforward control to consume electric power of the battery 6. As a result, the SOC of the battery 6 decreases below the charge limit value, and the first MG 11 can generate electric power by the amount of the reduction in the SOC of the battery 6. Thus, the engine torque Te can be generated. In particular, the engine torque Te can be effectively used by balancing the power consumed by the second MG 21 and the power generated by the first MG 11.

Thus, the axle 92 is rotated by a total torque Tp of the direct torque Tep and the torque Tmp of the second MG 21. Then, as indicated by a solid line in FIG. 11, when the rotation speed Nm of the second MG 21 reaches the positive rotation speed threshold value Nth, the drive mode is switched to the one-phase control.

Next, a determination process performed by the rotating electrical machine drive system 1 for switching the drive mode of the second MG 21 is described with reference to a flow chart in FIG. 12.

The determination process starts at S21 where the second MG controller 25 determines whether the number of the effective sensor-phases of the second MG 21 is not less than two. If the number of the effective sensor-phases of the second MG 21 is not less than two corresponding to YES at S21, the determination process proceeds to S25 where the two-phase control is selected as the drive mode.

In contrast, if the number of the effective sensor-phases of the second MG 21 is less than two corresponding to NO at S21, the determination process proceeds to S22 where it is determined whether the number of the effective sensor-phases of the second MG 21 is one.

If the number of the effective sensor-phases of the second MG 21 is zero corresponding to NO at S22, the determination process proceeds to S28 where all the switching devices of the second MG inverter 22 are turned OFF so that the second MG 21 can be shut down. Thus, unintended operation of the second MG inverter 22 can be prevented.

In contrast, if the number of the effective sensor-phases of the second MG 21 is one corresponding to YES at S22, the determination process proceeds to S23. At S23, it is determined whether the rotation number Nm of the second MG 21 is not less than the negative rotation speed threshold value −Nth and not greater than the positive rotation speed threshold value Nth. If a negative determination is made at S23, the determination process proceeds to S26 where the one-phase control is selected as the drive mode.

In contrast, if an affirmative determination is made at S23, the determination process proceeds to S24. At S24, it is determined whether the SOC of the battery 6 is not greater than the charge limit value. If the SOC of the battery 6 is not greater than the charge limit value corresponding to YES at S24, the determination process proceeds to S28 where all the switching devices of the second MG inverter 22 are turned OFF so that the second MG 21 can be shut down. After S28, the determination process proceeds to S29 where the axle 92 is rotated by the direct torque Tep of the engine.

In contrast, if the SOC of the battery 6 is greater than the charge limit value corresponding to NO at S24, the determination process proceeds to S27. At S27, the second MG 21 is driven by the voltage feedforward control to consume power of the battery 6, and the first MG 11 is driven to generate power in such manner that the power generated by the first MG 11 can balance the power consumed by the second MG 21. Thus, the axle 92 is rotated by the total torque Tp of the direct torque Tep and the torque Tmp of the second MG 21.

Next, a behavior of the rotating electrical machine drive system 1 observed when the number of the effective sensor-phases of the first MG 11 is one is described below with reference to FIGS. 13, 14, and 15.

Figure 13:
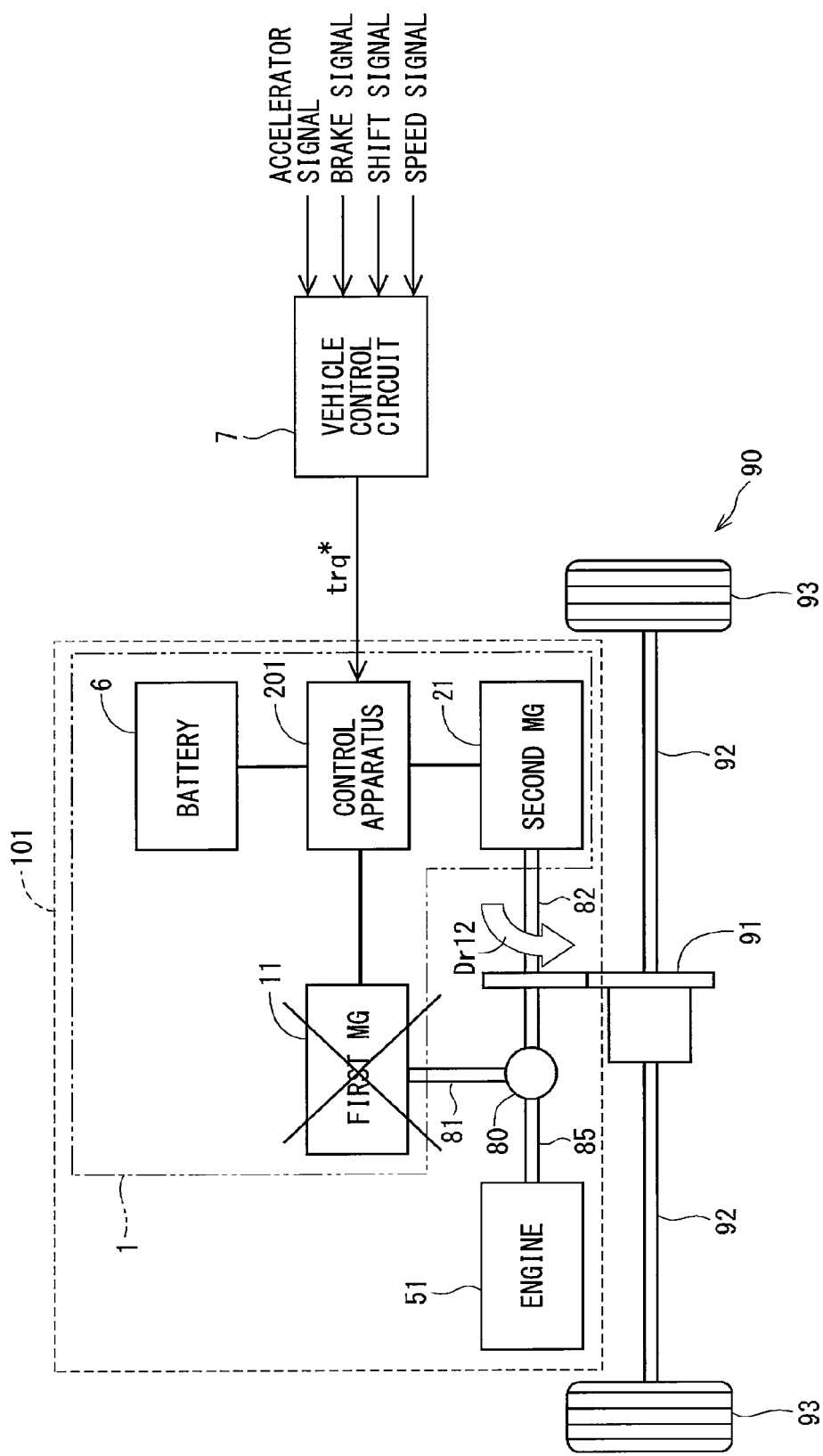
FIG. 13 is a diagram of the hybrid vehicle observed when the number of effective sensor-phases of a first MG is one in the rotating electrical machine drive system according to the first embodiment.

In FIG. 13, the symbol "X" on the first MG 11 indicates that one of the control current sensors 17 and 18 for the first MG 11 becomes abnormal, so that the number of the effective sensor-phases becomes one.

The rotating electrical machine drive system 1 increases the rotation speed Ng of the first MG 11 by using only the drive force Dr12 of the second MG 21 without using the drive force Dr11 of the first MG 11.

Figure 14:
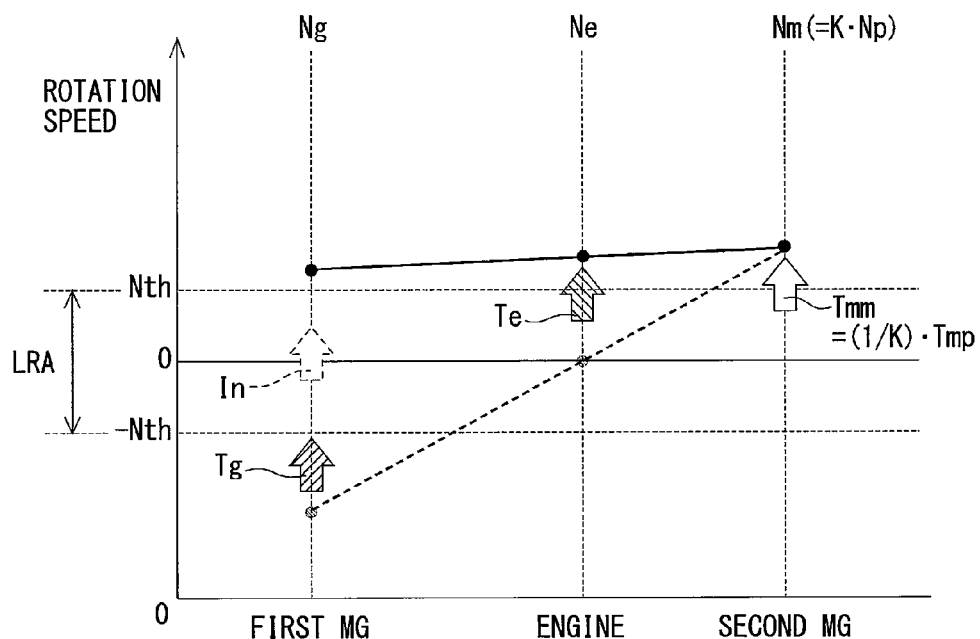
FIG. 14 is a collinear diagram observed when an engine is started up under a condition that the number of effective sensor-phases of the first MG is one in the rotating electrical machine drive system according to the first embodiment.

As indicated by a broken line in FIG. 14, when the engine 51 stops, and the axle 92 is rotated in a forward direction by only the torque Tmp of the second MG 21, the rotation speed Ne of the engine 51 is zero, the rotation speed Nm of the second MG 21 is a positive value greater than the positive rotation threshold value Nth, and the rotation number Ng of the first MG 11 is a negative value smaller than the negative rotation threshold value −Nth. At this time, the second MG 21 is being driven by the two-phase control, and the first MG 11 is being driven by the one-phase control.

When the engine 51 is started from this condition, the negative rotation speed Ng of the first MG 11 increases to approach zero due to the torque Tg of the first MG 11 driven by the one-phase control. As a result, the rotation speed Ng of the first MG 11 enters the designated low rotation speed range LRA. At the same time, since the engine 51 is controlled to generate the engine torque Te promptly, the rotation number Ng of the first MG 11 is increased by an inertial drive as indicated by an broken arrow In in FIG. 14. Thus, the rotation speed Ng of the first MG 11 changes from negative to positive, exceeds the positive rotation number threshold value Nth, and eventually exits the designated low rotation speed range LRA as indicated by a solid line in FIG. 14. Therefore, the first MG 11 can be driven by the one-phase control.

Figure 15:
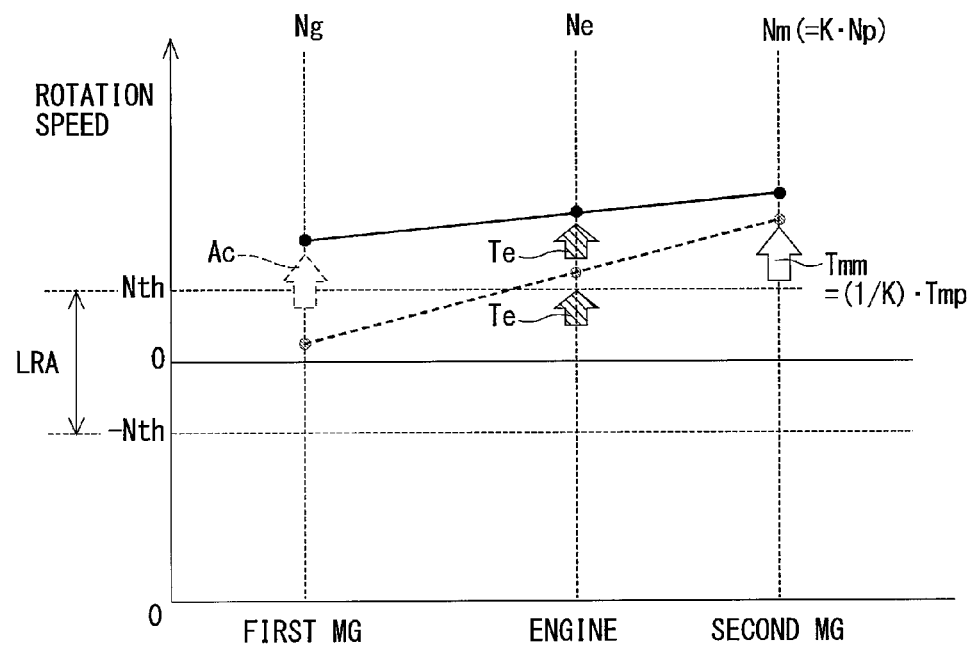
FIG. 15 is a collinear diagram observed when the engine is running under the condition that the number of effective sensor-phases of the first MG is one in the rotating electrical machine drive system according to the first embodiment.

Next, in an operation condition indicated by a broken line in FIG. 15, the rotation speed Ne of the engine 51 is close to the positive rotation speed threshold value Nth, the rotation speed Nm of the second MG 21 is a positive value greater than the positive rotation speed threshold value Nth, and the rotation speed Ng of the first MG 11 is a positive value smaller than the positive rotation speed threshold value Nth. When the rotation of the axle 92 is accelerated from this condition, the rotation number Nmp of the axle 92 is increased by the torque Tmp of the second MG 21, and the engine 51 is controlled to generate the engine torque Te promptly. Thus, the rotation speed Ng of the first MG 11 is increased by an accompanying drive as indicated by a broken arrow Ac in FIG. 15. As a result, the rotation speed Ng of the first MG 11 exceeds the positive rotation number threshold value Nth and exits the designated low rotation speed range LRA as indicated by a solid line in FIG. 15. Therefore, the first MG 11 can be driven by the one-phase control.

Next, a determination process performed by the rotating electrical machine drive system 1 for switching the drive mode of the first MG 11 is described with reference to a flow chart in FIG. 16.

The determination process starts at S11 where the first MG controller 15 determines whether the number of the effective sensor-phases of the first MG 11 is not less than two. If the number of the effective sensor-phases of the first MG 11 is not less than two corresponding to YES at S11, the determination process proceeds to S15 where the two-phase control is selected as the drive mode.

In contrast, if the number of the effective sensor-phases of the first MG 11 is less than two corresponding to NO at S11, the determination process proceeds to S12 where it is determined whether the number of the effective sensor-phases of the first MG 11 is one.

If the number of the effective sensor-phases of the first MG 11 is zero corresponding to NO at S12, the determination process proceeds to S18 where all the switching devices of the first MG inverter 12 are turned OFF so that the first MG 11 can be shut down.

In contrast, if the number of the effective sensor-phases of the first MG 11 is one corresponding to YES at S12, the determination process proceeds to S13. At S13, it is determined whether the rotation number Ng of the first MG 11 is not less than the negative rotation speed threshold value –Nth and not greater than the positive rotation speed threshold value Nth. If a negative determination is made at S13, the determination process proceeds to S16 where the one-phase control is selected as the drive mode.

In contrast, if an affirmative determination is made at S13, the determination process proceeds to S18 where all the switching devices of the first MG inverter 12 are turned OFF so that the first MG 11 can be shut down. After S18, the determination process proceeds to S19 where the axle 92 is rotated by the inertial drive or the accompanying drive.

Advantages of the rotating electrical machine drive system 1 according to the first embodiment are described below.

(1) When the number of the effective sensor-phases of the second MG 21 is one, and the rotation speed Nm of the second MG 21 is in the designated low rotation speed range LRA, the control apparatus 201 drives the second MG 21 by using the drive force Dr11 of the first MG11 and the engine 51 as the other drive sources. Further, when the number of the effective sensor-phases of the first MG 11 is one, and the rotation speed Ng of the first MG 11 is in the designated low rotation speed range LRA, the control apparatus 201 drives the first MG 11 by using the drive force Dr12 of the second MG21 as the other drive sources. In this way, when the number of the effective sensor-phases of one of the second MG 21 and the first MG 11 is one, and the rotation speed of the one of the second MG 21 and the first MG 11 is in the designated low rotation speed range LRA, the one of the second MG 21 and the first MG 11 is driven by the drive force of the other of the second MG 21 and the first MG 11. In such an approach, the second MG 21 and the first MG 11 can be stably driven.

In particular, when the rotating electrical machine drive system 1 is used for a hybrid vehicle, a reduction in driveability can be prevented.

(2) The control apparatus 201 includes the abnormality determinators 16 and 26. The abnormality determinator 16 determines whether the control current sensors 17 and 18 for the first MG 11 are normal or abnormal. Likewise, the abnormality determinator 26 determines whether the control current sensors 27 and 28 for the second MG 21 are normal or abnormal. For example, when the abnormality determinator 26 outputs the determination signal indicating that one of the control current sensors 27 and 28 is abnormal, the drive mode of the second MG 21 can be switched from the two-phase control to the one-phase control or the voltage feedforward control based on the determination signal and the rotation number Nm of the second MG 21. Thus, even when one of the control current sensors becomes abnormal, so that the number of the effective sensor-phases becomes one, the rotating electrical machine can be stably driven.

(3) When the number of the effective sensor-phases of the second MG 21 is one, and the SOC of the battery 6 is greater than the charge limit value, the control apparatus 201 causes the second MG 21 to be self-driven to consume electric power of the battery 6. Thus, the control apparatus 201 drives the second MG 21 by using the drive force of the engine 51 and the first MG 11 in such a manner that the SOC of the battery 6 does not exceed the charge limit value. Therefore, even when the first MG 11 generates electric power, the SOC of the battery 6 can be kept below the charge limit value.

(4) When the number of the effective sensor-phases of the first MG 11 is one, the control apparatus 201 causes the rotation speed Ng of the first MG 11 to promptly exit the designated low rotation speed range LRA by the inertial drive at the startup of the engine 51 and by the accompanying drive at the operation of the engine 51. In such an approach, since the drive mode of the first MG 11 is switched to the one-phase control promptly, the first MG 11 can be stably driven.

Second Embodiment

Figure 17:
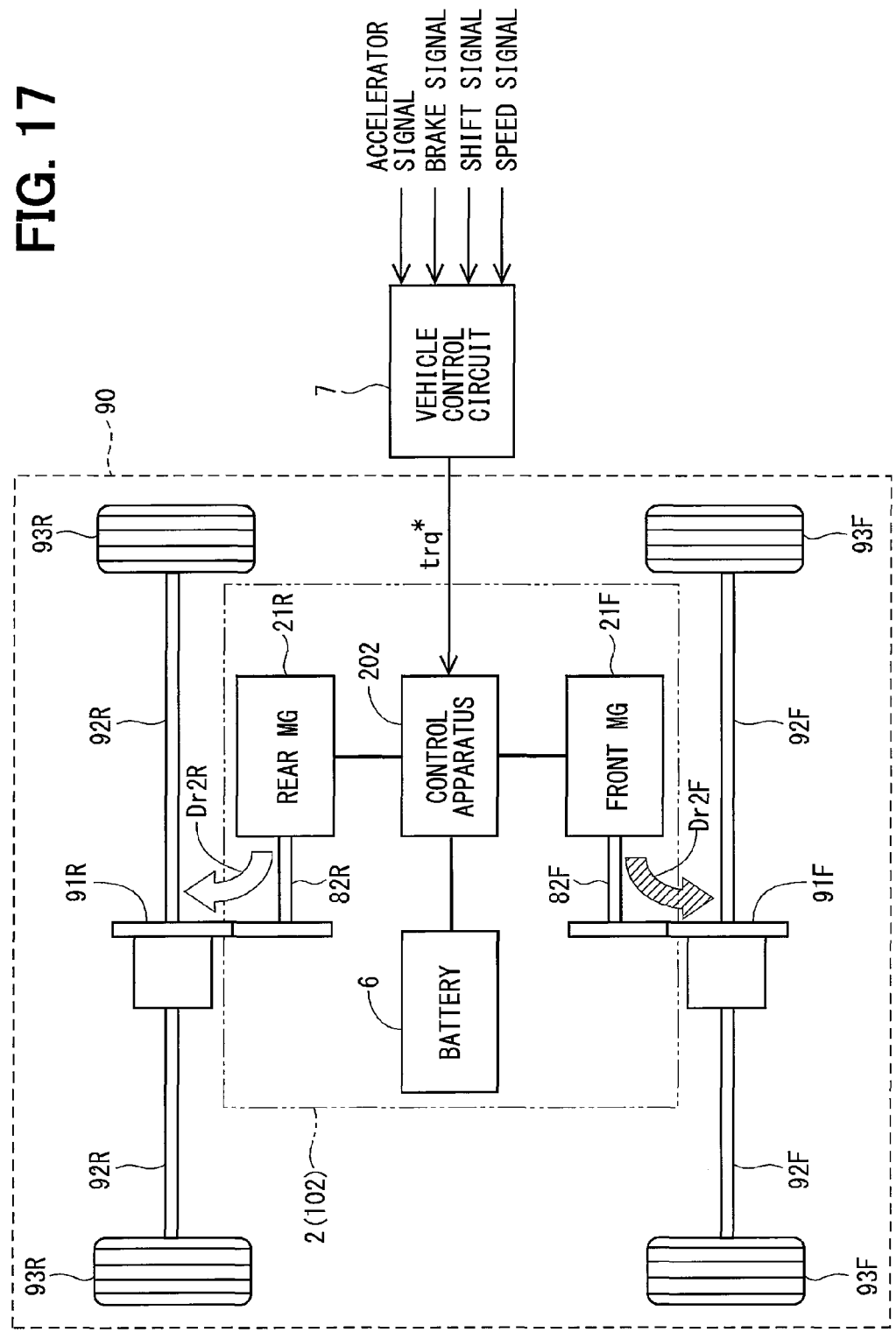
FIG. 17 is a diagram of an electric vehicle equipped with an axle drive system including a rotating electrical machine drive system according to a second embodiment of the present disclosure.

A rotating electrical machine drive system 2 according to a second embodiment of the present disclosure is described below with reference to FIGS. 17-20. Differences between the first embodiment and the second embodiment are as follows. As shown in FIG. 17, an axle drive system 102 according to the second embodiment does not include the engine 51 as a power source other than the rotating electrical machine. That is, the rotating electrical machine drive system 2 forms the whole of the axle drive system 102. The axle drive system 102 can be used for an electric vehicle.

The rotating electrical machine drive system 1 includes a front MG 21F for a front wheel, a rear MG 21R for a rear wheel, the battery 6, and a control apparatus 202. Each of the front MG 21F and the rear MG 21R functions mainly as a motor. The front MG 21F and the rear MG 21R can apply drive forces Dr2F and Dr2R to a front wheel axle 92F and a rear wheel axle 92R of the vehicle body 90, respectively. The vehicle body 90 corresponds to a target object recited in claims. The front wheel axle 92F and the rear wheel axle 92R correspond to a plurality of rotary shafts recited in claims.

Rotations of the front wheel axle 92F and the rear wheel axle 92R act on the vehicle body 90 in an overlapping manner. The "overlapping manner" indicates that a direction in which the vehicle body 90 moves with the rotation of the front wheel axle 92F is not opposite to a direction in which the vehicle body 90 moves with the rotation of the rear wheel axle 92R. That is, the "overlapping manner" indicates that the vehicle body 90 moves with the rotations of the front wheel axle 92F and the rear wheel axle 92R in one direction or indicates that the vehicle body 90 moves with the rotation of one of the front wheel axle 92F and the rear wheel axle 92R under a condition that the other of the front wheel axle 92F and the rear wheel axle 92R spins out. Thus, the front MG 21F and the rear MG 21R apply the drive forces Dr2F and Dr2R to the front wheel axle 92F and the rear wheel axle 92R, respectively, in such a manner that the drive forces Dr2F and Dr2R do not cancel each other.

A relationship between a rotary shaft 82F of the front MG 21F and a reduction gear 91F, the front wheel axle 92F, and a front wheel 93F is the same as the relationship between the rotary shaft 82 of the second MG 21 and the reduction gear 91, the axle 92, and the wheel 93 described in the first embodiment. Likewise, a relationship between a rotary shaft 82R of the rear MG 21R and a reduction gear 91R, the rear wheel axle 92R, and a rear wheel 93R is the same as the relationship between the rotary shaft 82 of the second MG 21 and the reduction gear 91, the axle 92, and the wheel 93 described in the first embodiment. Each of the reduction gears 91F and 91R has the same gear ratio K. The battery 6 supplies DC power to each of the front MG 21F and the rear MG 21R. The control apparatus 202 is configured in the same manner as the control apparatus 201 of the first embodiment (refer to FIG. 3).

Like the second MG 21 of the first embodiment, each of the front MG 21F and the rear MG 21R is provided with two control current sensors, one of which is provided to any one of three phases, and the other of which is provided to one of the others of the three phases. Thus, in normal times, the number of effective sensor-phases of each of the front MG 21F and the rear MG 21R is two, and the control apparatus 202 drives the front MG 21F and the rear MG 21R by the two-phase control.

Figure 18:
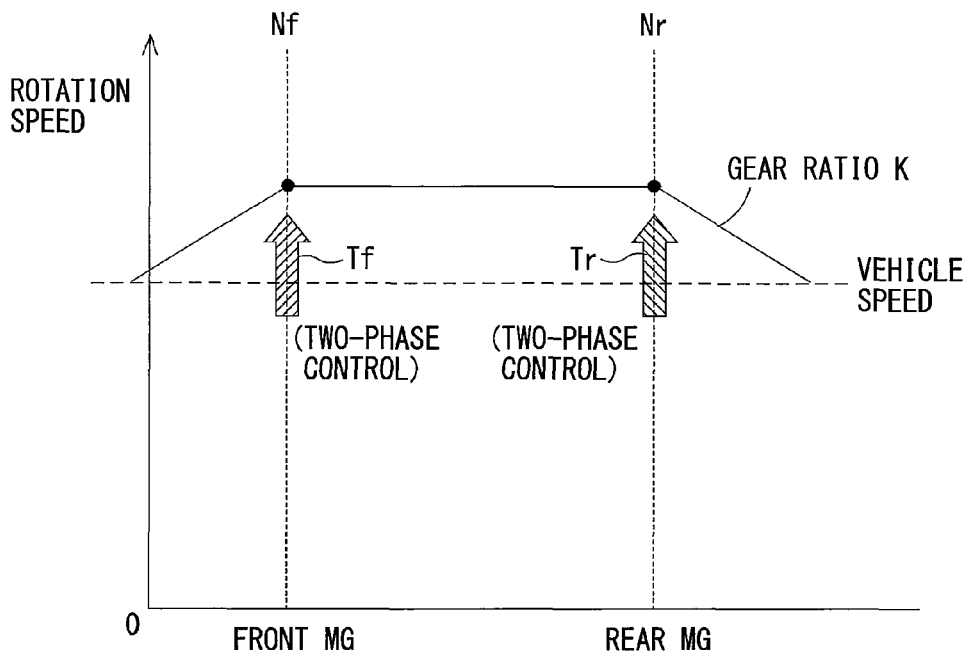
FIG. 18 is a collinear diagram for explaining a behavior of the axle drive system including the rotating electrical machine drive system according to the second embodiment.

As shown in FIG. 18, in normal times, a rotation speed Nf and a torque Tf of the front MG 21F are equal to a rotation speed Nr and a torque Tr of the rear MG 21R, respectively. The vehicle speed is proportional to the rotation speed Nf of the front MG 21F and the rotation speed Nr of the rear MG 21R based on the gear ratio K.

Figure 19:
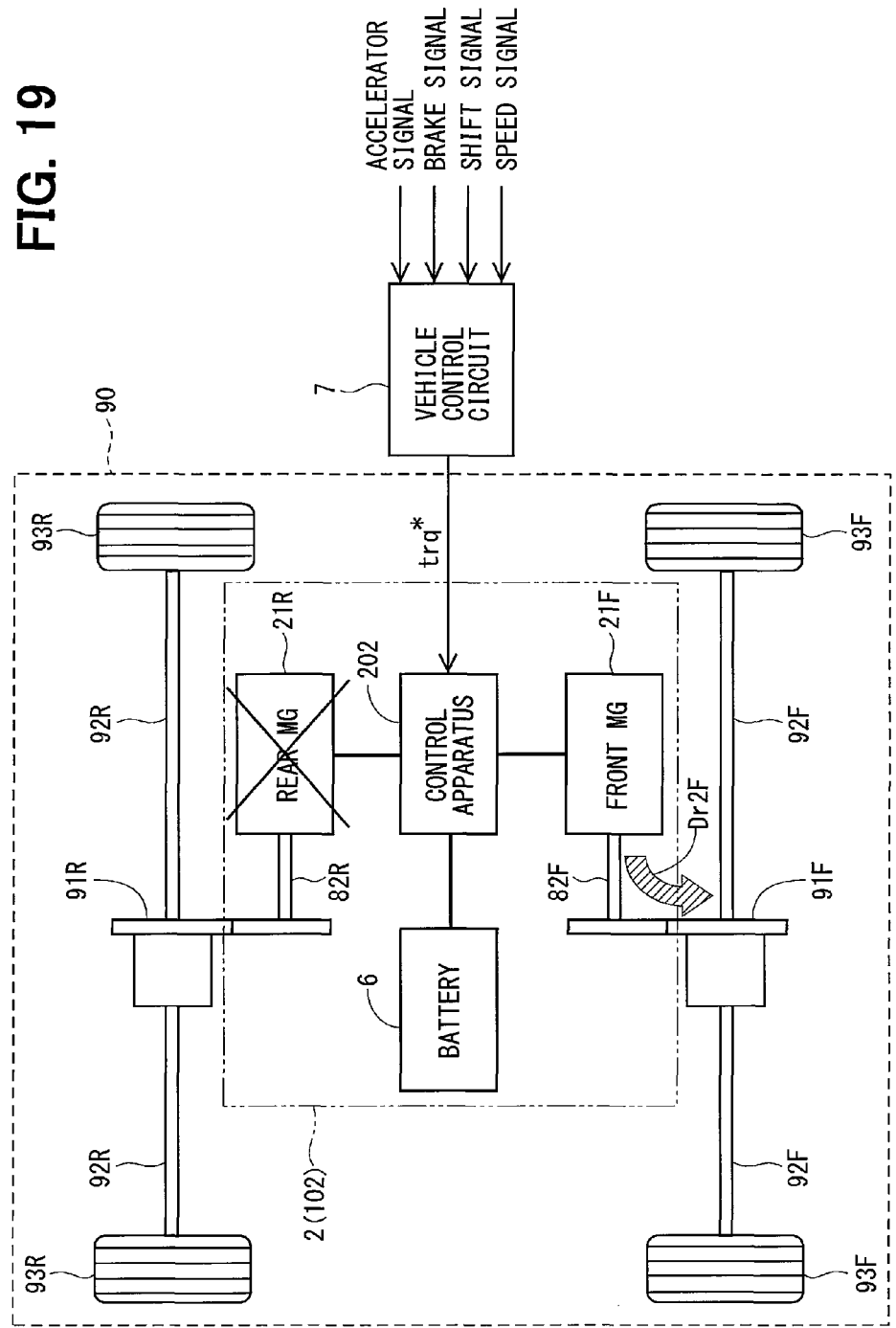
FIG. 19 is a diagram of the electric vehicle observed when the number of effective sensor-phases of a rear MG is one in the rotating electrical machine drive system according to the second embodiment.

FIG. 19 shows an example where one of the control current sensors for the rear MG 21R becomes abnormal, so that the number of the effective sensor-phases of the rear MG 21R becomes one.

Figure 20:
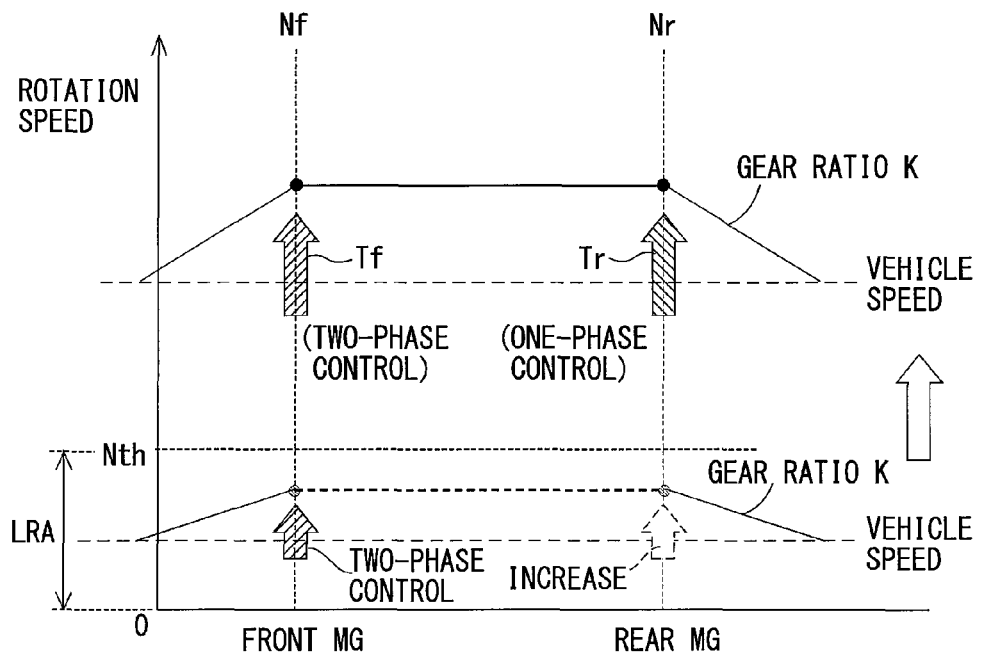
FIG. 20 is a collinear diagram observed when the number of effective sensor-phases of the rear MG is one in the rotating electrical machine drive system according to the second embodiment.

As shown in FIG. 20, when the rotation speed Nf of the front MG 21F and the rotation speed Nr of the rear MG 21R are outside the designated low rotation speed range LRA, the control apparatus 202 drives the front MG 21F by the two-phase control and drives the rear MG 21R by the one-phase control.

In contrast, when the rotation speed Nf of the front MG 21F and the rotation speed Nr of the rear MG 21R are within the designated low rotation speed range LRA, the control apparatus 202 drives the front MG 21F by the two-phase control and shuts down the rear MG 21R. Then, the rear MG 21R is driven by using the drive force Dr2F of the front MG 21F so that the rotation speed Nr of the rear MG 21R can be increased as indicated by a broken arrow in FIG. 20. Then, when the rotation speed Nr of the rear MG 21R exits the designated low rotation speed range LRA, the control apparatus 202 drives the rear MG 21R by the one-phase control.

In this example, the rear MG 21R corresponds to a specific rotating electrical machine recited in claims, and the front MG 21F corresponds to other drive sources recited in claims. In contrast, when one of the control current sensors for the front MG 21F becomes abnormal, so that the number of the effective sensor-phases of the front MG 21F becomes one, the front MG 21F is driven by using the drive force Dr2R of the rear MG 21R in the designated low rotation speed range LRA. In this case, the front MG 21F corresponds to a specific rotating electrical machine recited in claims, and the rear MG 21R corresponds to other drive sources recited in claims.

As described above, according to the second embodiment, the vehicle body 90 is propelled when at least one of the drive force Dr2F of the front MG 21F and the drive force Dr2R of the rear MG 21R rotates a corresponding one of the front wheel axle 92F and the rear wheel axle 92R. As long as one of the front MG 21F and the rear MG 21R can be driven by the two-phase control, the vehicle can start to run. If the number of the effective sensor-phases of each of the front MG 21F and the rear MG 21R becomes one, there is a need to start at least one of the front MG 21F and the rear MG 21R by the voltage feedforward control to increase the rotation speed of the other of the front MG 21F and the rear MG 21R.

The second embodiment can have the advantages (1) and (2) described in the first embodiment. Since the second embodiment does not include a rotating electrical machine functioning mainly as a generator corresponding to the first MG 11 of the first embodiment, there is no need to deeply consider the SOC of the battery 6.

Third Embodiment

Figure 21:
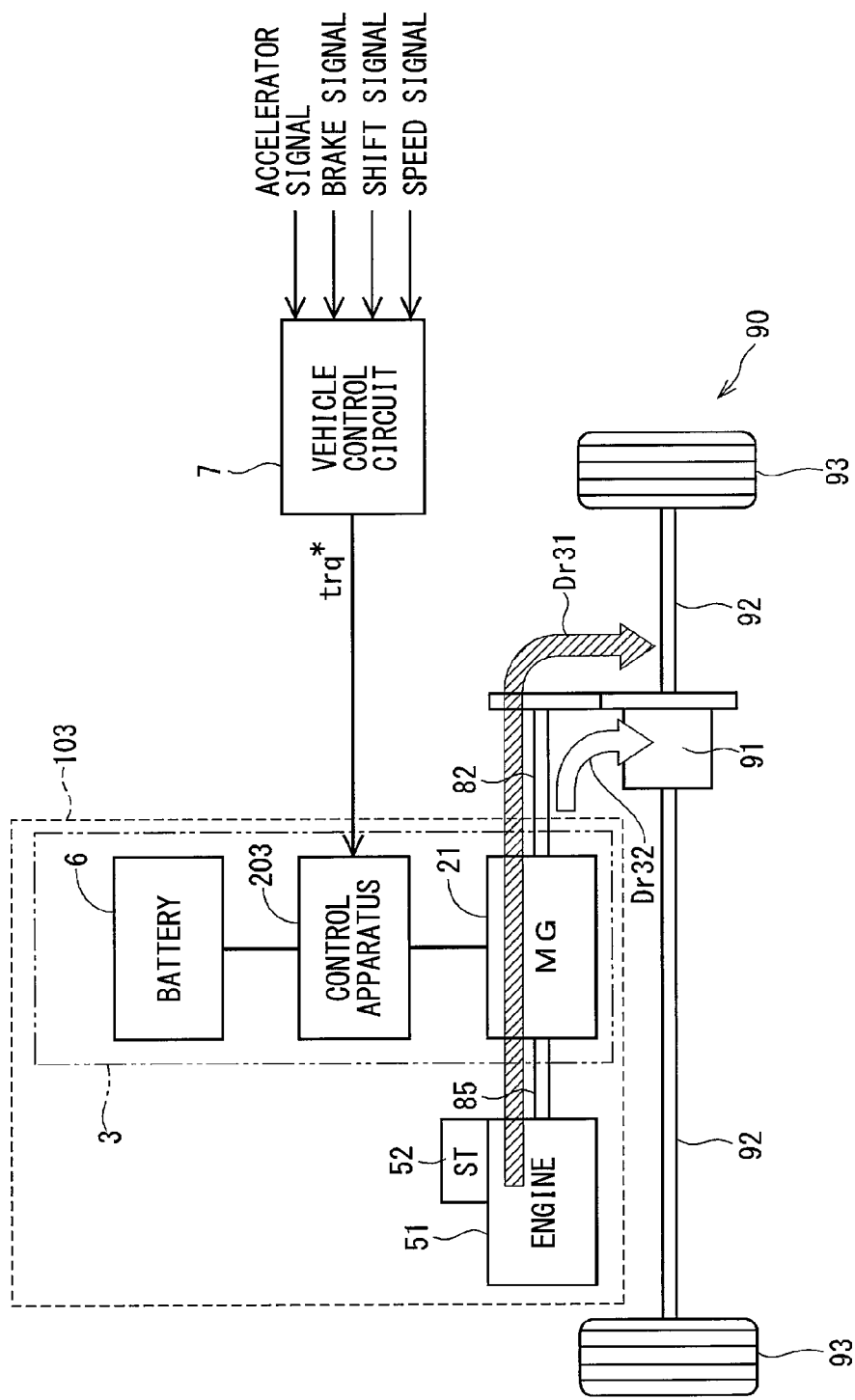
FIG. 21 is a diagram of a hybrid vehicle equipped with an axle drive system including a rotating electrical machine drive system according to a third embodiment of the present disclosure.

A rotating electrical machine drive system 3 according to a third embodiment of the present disclosure is described below with reference to FIGS. 21-24. Differences between the first embodiment and the third embodiment are as follows. As shown in FIG. 21, an axle drive system 103 according to the third embodiment includes the rotating electrical machine drive system 3, the engine 51, and a starter 52. The rotating electrical machine drive system 3 includes a MG 21, the battery 6, and a control apparatus 203. The MG 21 functions mainly as a motor. For example, the axle drive system 103 can be used for a hybrid vehicle.

The engine 51 can be started by not only the MG 21 but also the starter 52. A crankshaft 85 of the engine 51 is connected directly to the rotary shaft 82 of the MG 21 so that a drive force Dr 31 of the engine 51 can be transferred from the crankshaft 85 to the axle 92 through the rotary shaft 82 and the reduction gear 91.

The MG 21 is configured substantially in the same manner as the second MG 21 of the first embodiment. A drive force Dr32 of the MG 21 is transferred from the rotary shaft 82 to the axle 92 through the reduction gear 91. The MG 21 has a function of starting and assisting the engine 51 and a function of regenerating vehicle energy.

According to the third embodiment, the MG 21 corresponds to a specific rotating electrical machine recited in claims, and the engine 51 corresponds to other drive sources. The MG 21 and the engine 51 separately apply the drive forces Dr31 and Dr32 to the common axle 92.

The battery 6 of the rotating electrical machine drive system 3 supplies DC power to the MG 21. The control apparatus 203 is configured by removing the structure for the first MG 11 from the control apparatus 201 (refer to FIG. 3) of the first embodiment. In normal times, the number of effective sensor-phases of the MG 21 is two, and the control apparatus 203 drives the MG 21 by the two-phase control.

Figure 22:
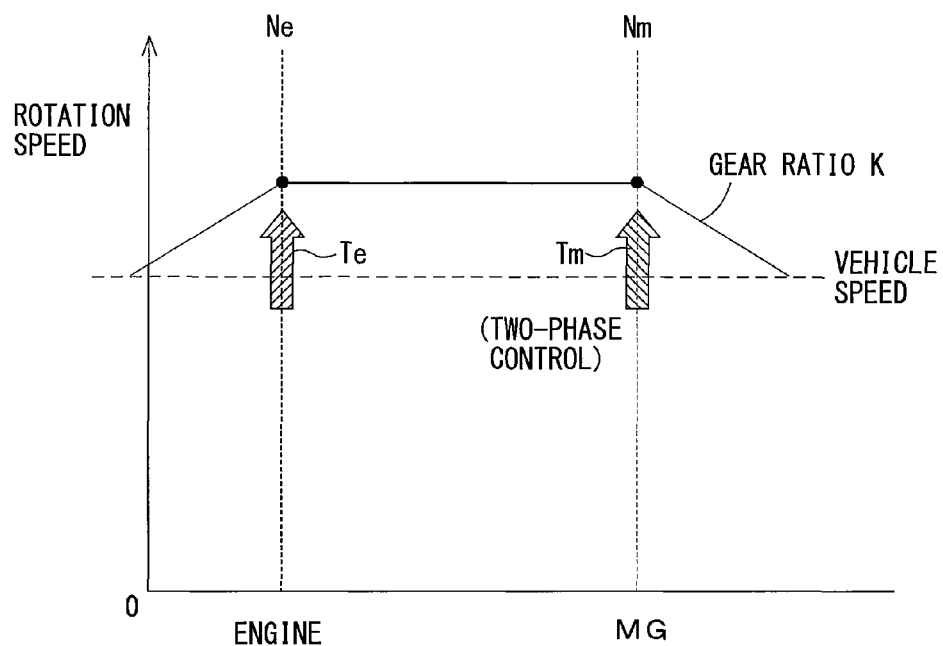
FIG. 22 is a collinear diagram for explaining a behavior of the axle drive system including the rotating electrical machine drive system according to the third embodiment.

As mentioned above, the crankshaft 85 of the engine 51 is connected directly to the rotary shaft 82 of the MG 21. In normal times, therefore, as shown in FIG. 22, a rotation speed Ne and a torque Te of the engine 51 are equal to a rotation number Nm and a torque Tm of the MG 21, respectively. The vehicle speed is proportional to the rotation speed Ne of the engine 51 and the rotation speed Nm of the MG 21 based on the gear ratio K.

Figure 23:
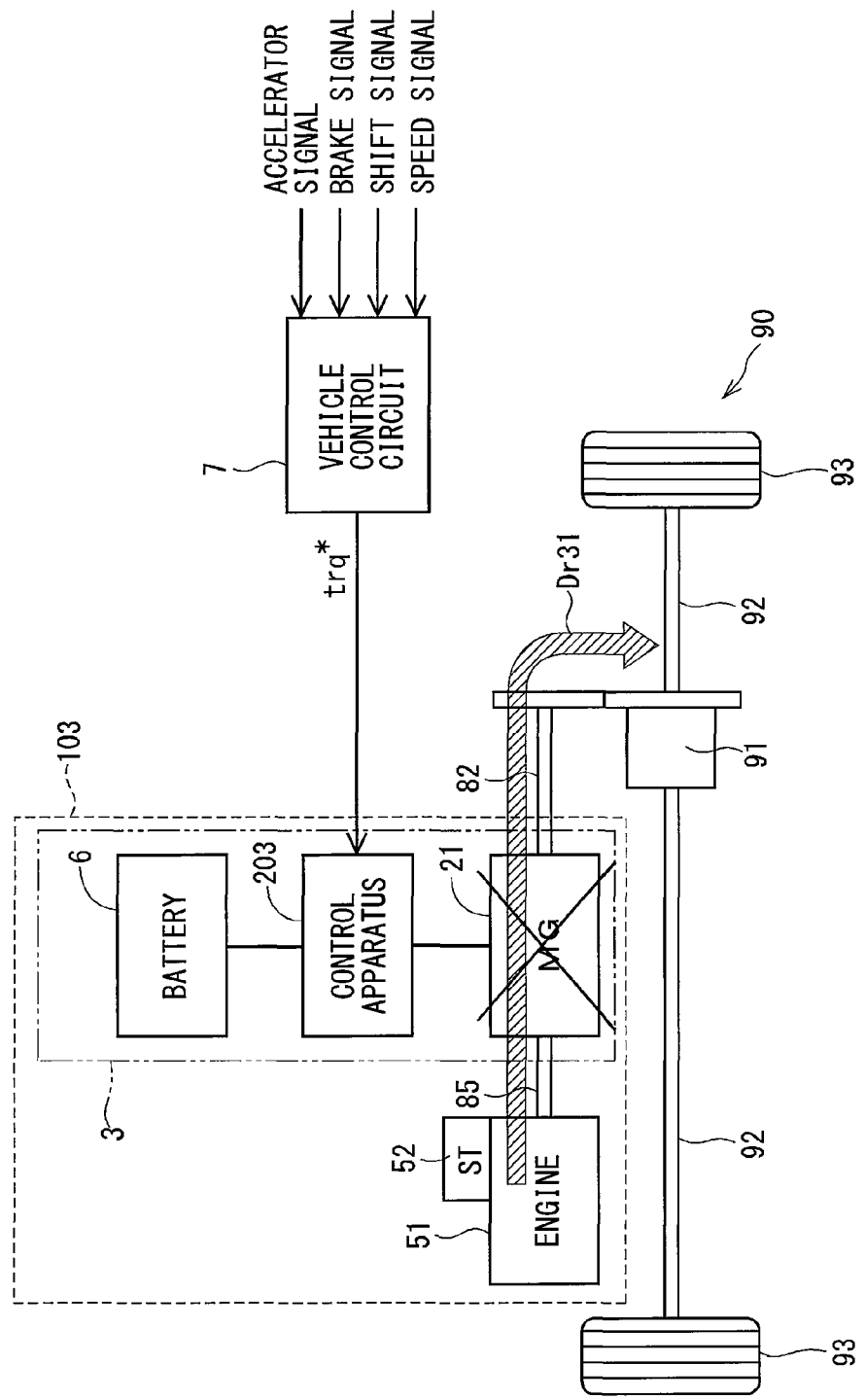
FIG. 23 is a diagram of the hybrid vehicle observed when the number of effective sensor-phases of a MG is one in the rotating electrical machine drive system according to the third embodiment.

FIG. 23 shows an example where one of the control current sensors for the MG 21 becomes abnormal, so that the number of the effective sensor-phases of the MG 21 becomes one.

Figure 24:
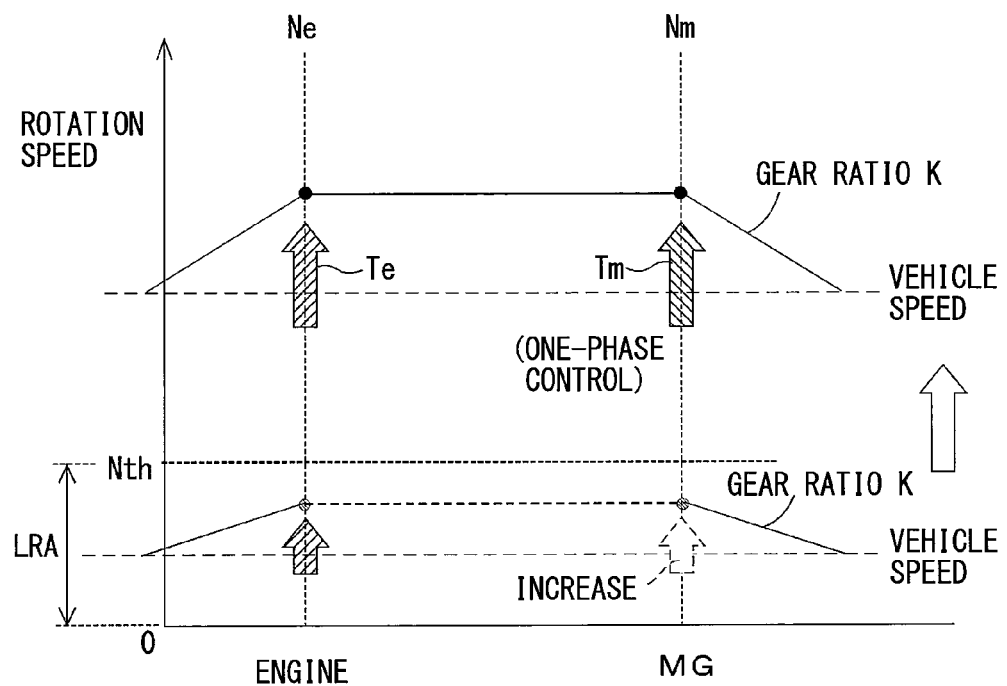
FIG. 24 is a collinear diagram observed when the number of effective sensor-phases of the MG is one in the rotating electrical machine drive system according to the third embodiment.

As shown in FIG. 24, when the rotation speed Ne of the engine 51 and the rotation speed Nm of the MG 21 are outside the designated low rotation speed range LRA, the control apparatus 203 drives the MG 21 by the one-phase control.

In contrast, when the rotation speed Ne of the engine 51 and the rotation speed Nm of the MG 21 are within the designated low rotation speed range LRA, the control apparatus 203 shuts down the MG 21. Then, the MG 21 is driven by using the drive force Dr31 of the engine 51 so that the rotation speed Nm of the MG 21 can be increased as indicated by a broken arrow in FIG. 24. Then, when the rotation speed Nm of the MG 21 exits the designated low rotation speed range LRA, the control apparatus 203 drives the MG 21 by the one-phase control.

As described above, according to the third embodiment, the axle 92 is rotated by at least one of the drive force Dr31 of the engine 51 and the drive force Dr32 of the MG 21.

The engine 51 can be started by the starter 52. When the number of the effective sensor-phases of the MG 21 becomes one under a condition that there is no starter 52, there is a need to start the MG 21 by the voltage feedforward control to increase the rotation speed Ne of the engine 51.

The third embodiment can have the advantages (1) and (2) described in the first embodiment. Since the third embodiment does not include a rotating electrical machine functioning mainly as a generator corresponding to the first MG 11 of the first embodiment, there is no need to deeply consider the SOC of the battery 6.

(Modifications)

The embodiments can be modified in various ways, for example, as follows.

In the embodiments, the processes performed by the control apparatus 201-203 are explained by assuming that one of two control current sensors separately provided to two phases of the rotating electrical machine becomes abnormal, so that the number of the effective sensor-phases of the rotating electrical machine becomes one. Further, the present disclosure can be applied to a case where two of three control current sensors separately provided to three phases of the rotating electrical machine become abnormal, so that the number of the effective sensor-phases of the rotating electrical machine becomes one. Furthermore, the present disclosure can be applied to a case where only one control current sensor is originally provided to one phase of the rotating electrical machine. A monitor current sensor specialized to monitor whether the control current sensor is normal or abnormal can be added to at least one of any of the phases of the rotating electrical machine.

In the embodiments, two control current sensors are separately provided to the V-phase and the W-phase of the rotating electrical machine. Alternatively, one of the control current sensors can be provided to the U-phase instead of the V-phase or the W-phase.

For example, the current estimator 38 (refer to FIG. 6) can employ any of the following methods (i), (ii), (iii), and (iv) to perform the current estimation in the one-phase control instead of the method disclosed in the embodiments.

(i) Estimation based on a current reference angle, which is based on a current command phase angle, and a current amplitude (a conventional technique disclosed in JP-A-2004-159391).

When a U-phase is defined as a sensor-phase, a current amplitude (Ia) is calculated by dividing a current detection value (Iu) of the sensor-phase by a U-phase current reference angle ($\theta'$) which is calculated from an electrical angle and a current command phase angle which is calculated from d-axis and q-axis current command values (refer to formulas (5.1)). Then, the other two phase current estimations values iv, iw are calculated by multiplying the current amplitude by sine values of electrical angles shifted by ±120° with respect to U-phase current reference angle (refer to formulas (5.2) and (5.3)).

$$Ia = Iu/[\sqrt{(1/3)} \times \{-\sin(\theta')\}] \quad (5.1)$$

$$Iv = \sqrt{(1/3)} \times Ia \times \{-\sin(\theta'+120°)\} \quad (5.2)$$

$$Iw = \sqrt{(1/3)} \times Ia \times \{-\sin(\theta'+240°)\} \quad (5.3)$$

(ii) Estimation Based on a Sensor-Phase Reference Phase Using a Current Command Value A α-axis current iα in a α-axis direction coinciding with a sensor-phase and a β-axis current in a β-axis direction perpendicular to the sensor-phase are calculated based on a W-phase current detection value iw_sns, an electrical angle θe, and at least one of a U-phase current command value iu* and a V-phase current command value iv*. Then, a sensor-phase reference current phase θx is calculated from the following formula (6).

$$\theta x = \tan^{-1}(i\beta/i\alpha) \quad (6)$$

Then, one of a U-phase current estimation value iu_est and a V-phase current estimation value iv_est is calculated based on the sensor-phase reference current phase θx and the W-phase current detection value iw_sns. Then, d-axis and q-axis current estimation values iu_est and iv_est are calculated based on the W-phase current detection value iw_sns, the electrical angle θe, and the one of the U-phase current estimation value iu_est and the V-phase current estimation value iv_est.

When the one of the U-phase current estimation value iu_est and the V-phase current estimation value iv_est is calculated, a correction process can be performed to avoid division by zero and/or multiplication by zero.

(iii) Estimation Based on Differential of α-Axis Current

Since a α-axis current iα and a β-axis current iβ have a relationship between a sine wave and a cosine wave, there is a phase difference of 90[°] between the α-axis current iα and the β-axis current iβ. From this point of view, a β-axis current estimation value iβ_est is calculated based on a α-axis current differential value Δiα. When the calculation in the controller is discrete, the α-axis current differential value Δiα is delayed by a half of an electrical angle change Δθe, i.e., delayed by Δθe/2, with respect to the actual β-axis current iβ. For the above reason, it is preferable that the β-axis current estimation value iβ_est should be corrected by a correction value H which is calculated by multiplying Δθe/2 by an average of previous and present values of the α-axis current iα. Then, a sensor-phase reference current phase θx is calculated based on the α-axis current iα and the β-axis current estimation value iβ_est in the same manner as in the method (ii).

(iv) Estimation Based on a Recurrence Formula

Based on the fact that a W-phase axis relatively rotates on a dq coordinate, a W-phase estimation error Δiw_est is integrated so that d-axis and q-axis current estimation values gradually approach d-axis and q-axis current actual values, respectively.

Specifically, a W-phase current reference value iw_bf which is a component of a sensor-phase is calculated based on previous values of the d-axis and q-axis current estimation value id_est and iq_est, and a present value of the electrical angle θe. Then, the W-phase estimation error Δiw which is a difference between the W-phase current reference value iw_bf and the W-phase current detection value iw_sns is calculated. Then, a corrected error KΔiw is calculated by multiplying the W-phase estimation error Δiw by a gain K which is a filter factor. Then, d-axis and q-axis correction values id_crr and iq_crr are calculated by dq transformation of the corrected error K$\Delta$iw under conditions that $\Delta$iu=0, and $\Delta$iv=0.

Then, the d-axis and q-axis correction values id_crr and iq_crr are defined as a sensor-phase direction correction vector, and d-axis and q-axis current estimation values id_est and iq_est are calculated by integrating the correction vector on a dq coordinate system.

Alternatively, orthogonal direction correction values orthogonal to the sensor-phase can be calculated and defined as an orthogonal direction correction vector, and the d-axis and q-axis current estimation values id_est and iq_est can be calculated by integrating a resultant vector of the sensor-phase direction correction vector and the orthogonal direction correction vector on the dq coordinate system.

In the embodiments, all the switching devices of the inverter are turned OFF so that the rotating electrical machine can be shut down to prevent an unintended operation of the rotating electrical machine, when the voltage feedforward control is not performed under conditions that the number of the effective sensor-phases of the rotating electrical machine is one and that the rotation speed of the rotating electrical machine is outside the designated low rotation speed range LRA (refer to S28 in FIG. 12, and S18 in FIG. 16). Alternatively, the unintended operation of the rotating electrical machine can be prevented by masking voltage commands of all phases without shutting down the rotating electrical machine.

An absolute value of the positive rotation threshold value Nth can be either equal to or different from an absolute value of the negative rotation threshold value −Nth. When the absolute value of the positive rotation threshold value Nth is set equal to the absolute value of the negative rotation threshold value −Nth, the drive mode can be switched based on a result of comparison between an absolute value of the rotation speed and the rotation threshold value.

In the first embodiment, the first MG 11 can be driven by the voltage feedforward control when the rotation speed Ng of the first MG 11 passes the designated low rotation speed range LRA by the inertial drive In (refer to FIG. 14) at the startup of the engine 51 under a condition that the number of the effective sensor-phases is one. Further, to more stably drive the first MG 11, the engine 51 can be always started, when one of the control current sensors 17 and 18 becomes abnormal, so that the number of the effective sensor-phases of the first MG 11 becomes one.

A third rotating electrical machine instead of the engine 51 can be added as a drive source so that multiple drive forces can be applied to the axle 92 by three rotating electrical machines and the force transmission mechanism 80.

In the second embodiment, as shown in FIG. 17, the battery 6 and the control apparatus 202 are commonly used by the front MG 21F and the rear MG 21R. Alternatively, each of the front MG 21F and the rear MG 21R can be provided with an individual battery and an individual control apparatus.

In the second embodiment, one of the front MG 21F and the rear MG 21R can be replaced with the engine 51 with the starter 52 so that multiple drive forces of the rotating electrical machine and the engine can be applied to the front wheel axle 92F and the rear wheel axle 92R which act on the vehicle body 90 in an overlapping manner.

In the third embodiment, another transmission and clutch can be added between the crankshaft 85 of the engine 51 and the MG 21 or between the rotary shaft 82 of the MG 21 and the reduction gear 91.

In any of the embodiments, the location of the transmission, the gear ratio, and the presence or absence of the clutch can be flexibly determined based on the rotation speed and the connection condition.

In the embodiments, the rotation angle sensor detects and outputs the electrical angle $\theta$e to the controller. Alternatively, the rotation angle sensor can detect and output a mechanical angle $\theta$m to the controller, and a conversion of the mechanical angle $\theta$m to the electrical angle $\theta$e can be performed in the controller. Further, the rotation speeds Ng and Nm can be calculated based on the mechanical angle $\theta$m.

In the embodiments, the rotating electrical machine is of a permanent magnet three-phase synchronous type. Alternatively, the rotating electrical machine can be an induction type or another synchronous type.

In the second and third embodiments, the rotating electrical machine can have no function as a generator.

In the first embodiment, the force transmission mechanism 80 is configured as a planetary gear train to mechanically transfer the drive force. Alternatively, the force transmission mechanism 80 can be configured as an electromagnetic clutch, a hydraulic (fluid) coupling, or the like.

In the embodiments, the rotating electrical machine drive system according to the present disclosure is used in the axle drive system for driving the axle of the motor-operated vehicle. Alternatively, the rotating electrical machine drive system can be used in a drive system which drives a rotary shaft other than the axle of the motor-operated vehicle.

What is claimed is:

1. A rotating electrical machine drive system for driving at least one three-phase rotating electrical machine of a plurality of drive sources included in a rotary shaft drive system for applying separate drive forces to one rotary shaft acting on a target object or for applying the drive forces to a plurality of rotary shafts acting on the same target object in an overlapping manner, the rotating electrical machine drive system comprising:

a specific rotating electrical machine which is one of the at least one three-phase rotating electrical machine;

a rotation speed calculator configured to calculate a rotation speed of the specific rotating electrical machine;

a control current sensor configured to detect a current of at least one phase of the specific rotating electrical machine, the detected current being used for control of the specific rotating electrical machine; and a control apparatus configured to control the drive forces by controlling energization of the at least one three-phase rotating electrical machine, wherein the at least one phase of the specific rotating electrical machine, the current of which is detected by the control current sensor and capable of being used for the control of the specific rotating electrical machine, is defined as an effective sensor-phase of the specific rotating electrical machine, when the number of the effective sensor-phases is one, the control apparatus drives the specific rotating electrical machine in a one-phase control mode based on the current of the effective sensor-phase under a condition where the specific rotating electrical machine rotates in a forward direction and the rotation speed is greater than a predetermined positive threshold value or under a condition where the specific rotating electrical machine rotates in a reverse direction and the rotation speed is smaller than a predetermined negative threshold value, and when the number of the effective sensor-phases is one, the control apparatus drives the specific rotating electrical machine by using the drive force of at least one of the plurality of drive sources other than the specific rotating electrical machine under a condition where the specific rotating electrical machine rotates in the forward direction and the rotation speed is not greater than the positive threshold value or under a condition where the specific rotating electrical machine rotates in the reverse direction and the rotation speed is not smaller than the negative threshold value.

2. The rotating electrical machine drive system according to claim 1, wherein
when the control current sensor is normal, the number of the effective sensor phases is two or more;
the control apparatus includes an abnormality determinator configured to determine whether the control current sensor is normal or abnormal, the abnormality determinator configured to determine what the number of the effective sensor phases is when the control current sensor is abnormal,
when the number of the effective sensor-phases is two or more, the control apparatus drives the specific rotating electrical machine in a two-phase control mode based on the currents of the effective sensor-phases regardless of the rotation speed of the specific rotating electrical machine, and
when the control current sensor becomes normal, so that the number of the effective sensor-phases is reduced to one under the condition where the specific rotating electrical machine rotates in the forward direction and the rotation speed is greater than the positive threshold value or under the condition where the specific rotating electrical machine rotates in the reverse direction and the rotation speed is smaller than the negative threshold value, the control apparatus switches a drive mode of the specific rotating electrical machine from the two-phase control mode to the one-phase control mode.

3. The rotating electrical machine drive system according to claim 1, further comprising:
a first rotating electrical machine configured to generate electric power by the drive force of an engine, the first rotating electrical machine and the engine being included in the plurality of drive sources;
a power storage device configured to store the power generated by the first rotating electrical machine, the power storage device having a predetermined charge limit value; and
a second rotating electrical machine which is the specific rotating electrical machine and driven with a direct-current power supplied form the power storage device, wherein
a rotary shaft of the second rotating electrical machine is connected to a rotary shaft of the first rotating electrical machine through a force transmission mechanism.

4. The rotating electrical machine drive system according to claim 2, further comprising:
a first rotating electrical machine configured to generate electric power by the drive force of an engine, the first rotating electrical machine and the engine being included in the plurality of drive sources;
a power storage device configured to store the power generated by the first rotating electrical machine, the power storage device having a predetermined charge limit value; and
a second rotating electrical machine which is the specific rotating electrical machine and driven with a direct-current power supplied form the power storage device, wherein
a rotary shaft of the second rotating electrical machine is connected to a rotary shaft of the first rotating electrical machine through a force transmission mechanism.

5. The rotating electrical machine drive system according to claim 3, wherein
when the number of the effective sensor-phases of the second rotating electrical machine is one, and the power stored in the power storage device is not greater than the charge limit value, the control apparatus drives the second rotating electrical machine by using the drive forces of the engine and the first rotating electrical machine under the condition where the second rotating electrical machine rotates in the forward direction and the rotation speed is not greater than the positive threshold value or under the condition where the second rotating electrical machine rotates in the reverse direction and the rotation speed is not smaller than the negative threshold value.

6. The rotating electrical machine drive system according to claim 4, wherein
when the number of the effective sensor-phases of the second rotating electrical machine is one, and the power stored in the power storage device is not greater than the charge limit value, the control apparatus drives the second rotating electrical machine by using the drive forces of the engine and the first rotating electrical machine under the condition where the second rotating electrical machine rotates in the forward direction and the rotation speed is not greater than the positive threshold value or under the condition where the second rotating electrical machine rotates in the reverse direction and the rotation speed is not smaller than the negative threshold value.

7. The rotating electrical machine drive system according to claim 5, wherein
when the power stored in the power storage device is greater than the charge limit value, the control apparatus causes the second rotating electrical machine to be self-driven to consume the power stored in the power storage device while driving the second rotating electrical machine by using the drive forces of the engine and the first rotating electrical machine in such a manner that the power stored in the power storage device is not greater than the charge limit value.

8. The rotating electrical machine drive system according to claim 6, wherein
when the power stored in the power storage device is greater than the charge limit value, the control apparatus causes the second rotating electrical machine to be self-driven to consume the power stored in the power storage device while driving the second rotating electrical machine by using the drive forces of the engine and the first rotating electrical machine in such a manner that the power stored in the power storage device is not greater than the charge limit value.

9. The rotating electrical machine drive system according to claim 1, further comprising:
a first rotating electrical machine which is the specific rotating electrical machine and configured to generate electric power by the drive force of an engine; and
a second rotating electrical machine included in the plurality of drive sources, wherein
a rotary shaft of the second rotating electrical machine is connected to a rotary shaft of the first rotating electrical machine through a force transmission mechanism, and
when the number of the effective sensor-phases of the first rotating electrical machine is one, the control apparatus drives the first rotating electrical machine by using the drive force of the second rotating electrical machine under the condition where the second rotating electrical machine rotates in the forward direction and the rotation speed is not greater than the positive threshold value or under the condition where the second rotating electrical machine rotates in the reverse direction and the rotation speed is not smaller than the negative threshold value.

10. The rotating electrical machine drive system according to claim 2, further comprising:
a first rotating electrical machine which is the specific rotating electrical machine and configured to generate electric power by the drive force of an engine; and
a second rotating electrical machine included in the plurality of drive sources, wherein
a rotary shaft of the second rotating electrical machine is connected to a rotary shaft of the first rotating electrical machine through a force transmission mechanism, and
when the number of the effective sensor-phases of the first rotating electrical machine is one, the control apparatus drives the first rotating electrical machine by using the drive force of the second rotating electrical machine under the condition where the second rotating electrical machine rotates in the forward direction and the rotation speed is not greater than the positive threshold value or under the condition where the second rotating electrical machine rotates in the reverse direction and the rotation speed is not smaller than the negative threshold value.

* * * * *